United States Patent
Kobayashi et al.

(10) Patent No.: US 12,453,103 B2
(45) Date of Patent: Oct. 21, 2025

(54) THREE-DIMENSIONAL ARRAY DEVICE

(71) Applicant: JAPAN SCIENCE AND TECHNOLOGY AGENCY, Kawaguchi (JP)

(72) Inventors: Masaharu Kobayashi, Tokyo (JP); Toshiro Hiramoto, Tokyo (JP); Jixuan Wu, Tokyo (JP)

(73) Assignee: JAPAN SCIENCE AND TECHNOLOGY AGENCY, Kawaguchi (JP)

(*) Notice: Subject to any disclaimer, the term of this patent is extended or adjusted under 35 U.S.C. 154(b) by 405 days.

(21) Appl. No.: 17/949,385

(22) Filed: Sep. 21, 2022

(65) Prior Publication Data
US 2023/0014841 A1    Jan. 19, 2023

Related U.S. Application Data

(63) Continuation of application No. PCT/JP2021/013511, filed on Mar. 30, 2021.
(Continued)

(51) Int. Cl.
*H10B 61/00* (2023.01)
*H10B 63/00* (2023.01)
(Continued)

(52) U.S. Cl.
CPC ............ *H10B 63/84* (2023.02); *H10B 63/30* (2023.02); *H10D 30/6755* (2025.01); *H10N 70/24* (2023.02); *H10N 70/8833* (2023.02)

(58) Field of Classification Search
CPC ........... G11C 5/06; G11C 16/08; G11C 16/04; G11C 8/14; G11C 16/24; G11C 11/418;
(Continued)

(56) References Cited

U.S. PATENT DOCUMENTS 10,354,719 B2 *  7/2019  Chen .................. G11C 11/418
2011/0119215 A1   5/2011  Elmegreen et al.
(Continued)

FOREIGN PATENT DOCUMENTS

JP   2018007167 A   1/2018
JP   2018018569 A   2/2018
(Continued)

OTHER PUBLICATIONS

Morie. "Neuromorphic systems and physical devices." Oyo Buturi, The Japan Society of Applied Physics, 2019. vol. 88, Issue 7. pp. 481-485. URL:https://doi.org/10.11470/oubutsu.88.7_481. Cited in Specification. English machine translation provided.
(Continued)

*Primary Examiner* — Thong Q Le
(74) *Attorney, Agent, or Firm* — ROSSI, KIMMS & McDOWELL LLP

(57) ABSTRACT

A three-dimensional array device with multiple layers in height direction includes a first two-dimensional array circuit located in a first layer; and a second two-dimensional array circuit located in a second layer adjacent to the first layer and overlapped in a plan view with the first two-dimensional array circuit. Each of the first two-dimensional array circuit and the second two-dimensional array circuit has a first wiring group, an input part that inputs signals to the first wiring group, a second wiring group that intersects the first wiring group and an output part that outputs signals from the second wiring group. The output part in the first two-dimensional array circuit is overlapped in a plan view on the input part in the second two-dimensional array circuit and is connected in a signal transferable manner.

16 Claims, 21 Drawing Sheets

Related U.S. Application Data

(60) Provisional application No. 63/007,582, filed on Apr. 9, 2020.

(51) Int. Cl.
*H10D 30/67* (2025.01)
*H10N 70/00* (2023.01)
*H10N 70/20* (2023.01)

(58) Field of Classification Search
CPC .. G11C 13/00; G11C 5/02; G11C 8/08; G11C 11/412; G11C 11/34; G11C 11/56; G11C 13/02; G11C 7/00; G11C 7/18; G11C 11/24; G11C 11/36; G11C 11/39; G11C 11/4074; G11C 11/4091; G11C 16/10; G11C 16/26; G11C 16/34; G11C 17/06; G11C 17/14; G11C 17/16; G11C 7/10; G11C 8/00; G11C 8/04; G11C 8/12; H01L 23/522; H01L 23/528; H01L 25/065; H01L 23/00; H01L 21/768; H01L 23/48; H01L 23/525; H01L 25/18; H10B 43/27; H10B 41/27; H10B 41/35; H10B 43/35; H10B 41/10; H10B 43/10; H10B 12/00; H10B 41/50; H10B 43/40; H10B 43/50; H10B 10/00; H10B 41/41; H10B 80/00
See application file for complete search history.

(56) References Cited

U.S. PATENT DOCUMENTS

| | | |
|---|---|---|
| 2012/0051118 A1 | 3/2012 | Yamazaki et al. |
| 2012/0236628 A1 | 9/2012 | Ikeda |
| 2018/0018565 A1 | 1/2018 | Kurokawa et al. |
| 2018/0308546 A1 | 10/2018 | Tomita |
| 2019/0318230 A1 | 10/2019 | Cho et al. |

FOREIGN PATENT DOCUMENTS

| | | |
|---|---|---|
| KR | 1020190121048 A | 10/2019 |
| TW | I590385 B | 7/2017 |
| WO | 2012070236 A1 | 5/2012 |
| WO | 2018186863 A1 | 10/2018 |
| WO | 2018211398 A1 | 11/2018 |

OTHER PUBLICATIONS

International Search Report issued in Intl. Appln. No. PCT/JP2021/013511 mailed Jun. 15, 2021. English translation provided.
Written Opinion issued in Intl. Appln. No. PCT/JP2021/013511 mailed Jun. 15, 2021.
Wu. "A Monolithic 3D Integration of RRAM Array with Oxide Semiconductor FET for In-memory Computing in Quantized Neural Network AI Applications." 2020 Symposium on VLSI Technology Digest of Technical Papers. Jun. 14, 2020.
Press Release on website of The Institute of Industrial Science, the University of Tokyo, "[Press Release] Successful Development of New Devices with Three-Dimensional Integration of IGZO and Non-Volatile Memories—Expectations for High-Efficiency Hardware of Deep Learning." Jun. 14, 2020. URL: https://www.iis.u-tokyo.ac.jp/ja/news/3311/. English machine translation provided.
Wu. "3D Integration of RRAM Array with Oxide Semiconductor FET for In-Memory Computing." Proceedings of The 81st JSAP Autumn Meeting 2020. 11a-Z09-7. Aug. 26, 2020.
Wu. "A Monolithic 3D Integration of RRAM Array with Oxide Semiconductor FET for In-Memory Computing in Quantized Neural Network AI Applications." Presentation slides for The 81st JSAP Autumn Meeting 2020. 11a-Z09-7. Sep. 11, 2020.
Kobayashi. "A Monolithic Integration of RRAM Array and Oxide Semiconductor FET for In-memory Computing in 3D Neural Network." Presentation slides for D2T Symposium 2020. Sep. 17, 2020.
Kobayashi. "3D Neural Network By Monolithic Integration of RRAM Array with IGZO FET." ECS Transactions, 98 (8) 57-61 (2020). Sep. 22, 2020.
Kobayashi. "3D Neural Network by Monolithic Integration of RRAM Array with IGZO FET." The Electrochemical Society. Presentation slides for ECS Prime 2020. Oct. 4, 2020.
Kobayashi. "Monolithic Integration of Resistive Random Access Memory and Oxide Semiconductor Transistor for Realization of Three-Dimensional Neural Net." Presentation slides for NEDIA 7th Electronic Devices Forum Kyoto. Oct. 30, 2020. English machine translation of front page attached.
Wu. "A Monolithic 3-D Integration of RRAM Array and Oxide Semiconductor FET for In-Memory Computing in 3-D Neural Network." IEEE Transactions on Electron Devices. vol. 67, No. 12 pp. 5322-5328. Nov. 11, 2020.
Office Action issued in Japanese Appln. No. 2022-514426 mailed Jan. 7, 2025. English translation provided.
Office Action issued in Korean Appln. No. 10-2022-7034782 mailed Nov. 17, 2024. English translation provided.
Notice of Allowance issued in Taiwanese Appln. No. 110112909 dated Nov. 29, 2024. English machine translation provided.
English translation of Written Opinion issued in Intl. Appln. No. PCT/JP2021/013511 mailed Jun. 15, 2021, previously cited in IDS filed Sep. 21, 2022.

* cited by examiner

THREE-DIMENSIONAL ARRAY DEVICE

CROSS REFERENCE TO RELATED APPLICATIONS

This application is a Continuation of International Patent Application No. PCT/JP2021/013511, filed on Mar. 30, 2021, which claims the benefit of priority to U.S. Provisional Patent Application No. 63/007,582, filed on Apr. 9, 2020, the entire contents of which are incorporated herein by reference.

FIELD

One embodiment of the present invention relates to a three-dimensional array device. In particular, the present invention relates to a three-dimensional array device in which memory cell array circuits are stacked.

BACKGROUND

In recent years, with the dramatic improvement of computer performance and the development of deep learning, research on deep neural networks in which neural networks are multi-layered has been advanced. FIG. 30 is a diagram illustrating a configuration of a general neural network. In FIG. 30, a neuron performs a nonlinear operation of an activation function f(k) (collectively referred to as k=1, 2, ..., f) on a multiply-accumulate operation $\Sigma(Xi*Wi)$ of N inputs Xi (collectively referred to as x) and weights Wi (collectively referred to as w). In the deep neural network, inputs x are multiply-accumulated by a neuron of an input layer and converted into intermediate outputs 1. The intermediate outputs 1 are multiply-accumulated by the neurons of a hidden layer 1 and converted to intermediate outputs 2. After a similar iteration, they are converted to the final outputs y by the neurons of an output layer.

As described above, in the deep neural network, learning is performed by repeating a process of evaluating errors by performing a large number of multiply-accumulate operations and updating the weights. Therefore, when a semiconductor chip of a conventional Neumann-type architecture is used, there is a problem that power consumption due to communication between the memory and the CPU or between the memory and the GPU is large. Therefore, a non-volatile memory chip employing a non-Neumann type architecture called neuromorphic computing or in-memory computing has attracted attention. In a two-dimensional array circuit having a crossbar configuration in which a non-volatile memory element is arranged at an intersection of a word line and a bit line, a multiply-accumulate operation result in a bit line direction can be read out as an output with respect to data stored in each non-volatile memory. Such in-memory computing techniques have been employed in analog circuit implementations of neural networks since the 1980s (Takashi Morie, "Neuromorphic Systems and Physical Devices", Oyo-Buturi, Japan Society of Applied Physics, 2019, Vol. 88, No. 7, p. 481-485). For example, neural networks using non-volatile memory chips based on Re RAM (Resistive Random Access Memory) have been extensively studied from the device level to the system level. Since Re RAM has a function of an element called a memristor in which the resistive value changes by storing the quantity of charges flowing through the element, the weight Wi of the neural network can be controlled by an analogue value instead of a binary value of 0 or 1.

The deep neural networks are envisioned to be incorporated into a variety of devices as a core technique for supporting AI (Artificial Intelligence) applications. Therefore, a binary neural network that is easy to implement in digital hardware has been proposed. The non-volatile memories may be Re RAM, MRAM, or PCRAM. In particular, ReRAM based binary neural network has the benefits of good stability, wide noise margins, and high ease of testing, in addition to being able to use the analog-value weights described above. XNOR operations for weighted sum calculation in binary neural networks can be easily implemented as in-memory computing using ReRAM cells.

Since the binary neural network binarizes the weight value and the activation value, the binary neural network has a disadvantage of low expressiveness. Therefore, the binary neural network is generally used by increasing the computation accuracy by increasing the network size. However, when a large-scale parallel input/output is performed, there is a problem that an increase in footprint is caused in a two-dimensional binary neural network. Therefore, at present, a three-dimensional neural network in which two-dimensional neural networks are stacked is also studied. For example, a device having a 3D stacked structure in which a synaptic core layer and an interconnect layer are alternately stacked and the layers are connected by through-silicon-via-electrodes (TSVs) has been proposed (U.S. Publication No. 2019/0318230). As described above, the neural network is realized by the elements of 3D stacked-layer configuration, thereby improving the area-efficiency. Further, by enabling in-memory computing, it is possible to reduce power consumption of the neural network.

SUMMARY

A three-dimensional array device according to an embodiment of the present invention is a three-dimensional array device with multiple layers in a height direction, and includes: a first two-dimensional array circuit located in a first layer; and a second two-dimensional array circuit located in a second layer adjacent to the first layer and overlapping with the first two-dimensional array circuit in a plan view. Each of the first two-dimensional array circuit and the second two-dimensional array circuit has a first wiring group, an input part for inputting a signal to the first wiring group, a second wiring group intersecting with the first wiring group, and an output part for outputting a signal from the second wiring group. The output part in the first two-dimensional array circuit overlaps the input part in the second two-dimensional array circuit in a plan view and is connected in a signal transferable manner.

A three-dimensional array device according to an embodiment of the present invention is a three-dimensional array device with multiple layers in a height direction, and includes: a first two-dimensional array circuit located in a first layer; and a second two-dimensional array circuit located in a second layer adjacent to the first layer and overlapping the first two-dimensional array circuit in a plan view. Each of the first two-dimensional array circuit and the second two-dimensional array circuit has a first wiring group, an input part for inputting a signal to the first wiring group, a second wiring group intersecting with the first wiring group, and an output part for outputting a signal from the second wiring group. The output part in the first two-dimensional array circuit is located closer to the input part in the second two-dimensional array circuit than the output part in the second two-dimensional array circuit, and is connected to the input part in the second two-dimensional array circuit in a signal transferable manner. A direction in which the second wiring group extends in the first two-dimensional array circuit is approximately parallel to a direction in which the first wiring group extends in the second two-dimensional array circuit.

The input part in the first two-dimensional array circuit may not overlap the output part in the second two-dimensional array circuit in a plan view.

The output part in the first two-dimensional array circuit may be electrically connected to the input part in the second two-dimensional array circuit through a via.

Each of the first two-dimensional array circuit and the second two-dimensional array circuit may be memory cell array circuit. In this case, the first wiring group may be a wiring group consisting of word lines. The second wiring group may be a wiring group consisting of bit lines.

The memory cell array circuit may include at least one resistive random access memory and at least one selection transistor in each memory cell. In this case, the resistive random access memory may include a dielectric layer containing hafnium oxide. The selection transistor may include channels composed of an oxide-semiconductor containing IGZO.

DESCRIPTION OF EMBODIMENTS

Figure 1:
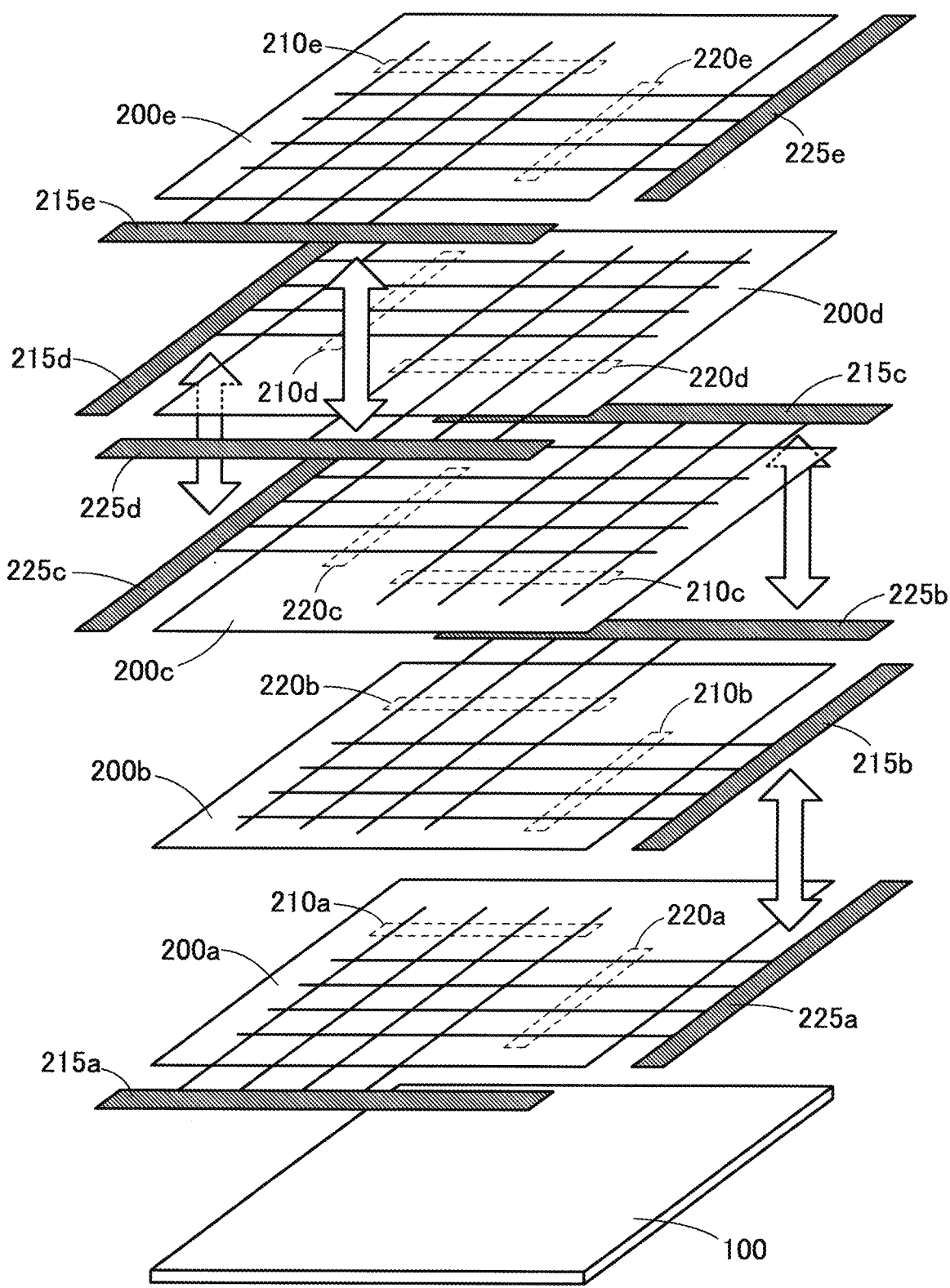
FIG. 1 is a diagram showing a configuration of a three-dimensional array device according to a first embodiment of the present invention.

In the three-dimensional neural network of the prior art, vertical integration has been difficult. This is because a technique such as TSV or wire bonding through the interconnect layer is necessary to connect the layers constituting the two-dimensional neural network to each other. In addition, in a case where a non-volatile memory chip for in-memory computing is stacked in the three-dimensional direction, an interconnect layer or wire bonding wiring connecting an output terminal of a lower-layer neural network and an input terminal of an upper-layer neural network may become long. In this case, an increase in signal delay and power consumption is caused by an increase in wiring length.

The purpose of the present invention is to provide a three-dimensional array device that realizes a neural network with low latency and low energy loss.

Hereinafter, embodiments of the present invention will be described with reference to the drawings and the like. However, the present invention can be implemented in various aspects without departing from the gist thereof, and is not to be construed as being limited to the description of the embodiments exemplified below. In the drawings, the widths, thicknesses, shapes, and the like of the respective portions may be schematically represented in comparison with the actual embodiments for clarity of explanation, but the drawings are just examples, and do not limit the interpretation of the present invention. In the present specification and the drawings, elements having the same functions as those described with respect to the above-described drawings are denoted by the same reference numerals, and duplicate descriptions thereof may be omitted.

In the present specification, a plurality of elements formed by performing processes such as etching on a single thin film may have different functions or roles. These elements are composed of the same layer structure and a thin film of the same material. In the present specification and claims, a plurality of elements formed from the same layer structure and a thin film of the same material will be referred to as "elements of the same layer".

In the present specification, "two two-dimensional array circuits overlap in a plan view" means that, in the two-dimensional array circuit, quadrilaterals formed by wirings at both ends of the first wiring group and wirings at both ends of the second wiring group overlap in a plan view. The overlapping area is preferably 50% or more, more preferably 75% or more, and most preferably 95% or more, based on the area of any one of the quadrilaterals.

In the present specification, "the input part and the output part overlap in a plan view" means that the quadrilateral of the minimum area including all the input terminals included in the input part and the quadrilateral of the minimum area including all the output terminals included in the output part overlap in a plan view. The overlapping area is preferably 50% or more, more preferably 75% or more, and most preferably 95% or more, based on the area of any one of the quadrilaterals. When the input terminal and the output terminal are vertically connected, for example, in the case of connection by a through-silicon via, the input part and the output part overlapped in a plan view at a ratio of 100%.

In the present specification, when describing elements shown in the drawings, reference numerals assigned to the elements will be used to describe the elements. At this time, a plurality of elements having the same function may be distinguished by attaching symbols such as alphabets (for example, "a", "b", and the like) to the same reference numerals. However, when it is not necessary to separately describe each element, the description may be made by using only the reference numerals indicating the element.

In the embodiments described below, the temperature conditions of the measurement or simulation are both at room temperature.

First Embodiment

[Structure of Three-Dimensional Array Device]

FIG. 1 is a diagram showing a configuration of a three-dimensional array device 10 according to a first embodiment of the present invention. As illustrated in FIG. 1, the three-dimensional array device 10 includes a control circuit 100 and two-dimensional array circuits 200a to 200e in order from the lower layer. The control circuit 100 controls each operation (for example, input and output of signals) of the two-dimensional array circuits 200a to 200e. Although FIG. 1 shows an example in which a five-layer two-dimensional array circuit is superposed in a vertical direction, the present invention is not limited to this example, and a two-layer or more layer structure can be used. Here, the "vertical direction" refers to a direction perpendicular to a plane constituting the two-dimensional array circuit. Since the three-dimensional array device 10 is a structure in which a plurality of two-dimensional array circuits 200a to 200e are sequentially stacked, the "vertical direction" can also be referred to as a "height direction" or an "up-down direction". In the following description, when it is not necessary to distinguish between the two-dimensional array circuits 200a to 200e, they are collectively referred to as two-dimensional array circuits 200.

The two-dimensional array circuits 200 are memory cell array circuits based on Re RAM (Resistive Random Access Memory). Specifically, the two-dimensional array circuit 200 includes a plurality of memory cells arranged in an array, and includes ReRAM in the respective memory cells. However, the memory arranged in the memory cell is not limited to ReRAM, and may be another non-volatile memory such as MRAM (Magnetoresistive Random Access Memory), FeRAM (Ferroelectric Random Access Memory), PCRAM (Phase Change Random Access Memory). Further, the two-dimensional array circuit 200 is not limited to the memory cell array circuit, and may be another array type circuit such as a CMOS sensor array circuit.

In the present embodiment, in-memory computing is realized using the three-dimensional array device 10. Specifically, each two-dimensional array circuit 200 constitutes a binary neural network (quantized neural network), and a plurality of binary neural networks are stacked to constitute a deep neural network. For example, the three-dimensional array device 10 may constitute the deep neural network in which the two-dimensional array circuit 200a, the two-dimensional array circuits 200b to 200d, and the two-dimensional array circuit 200e as the input layer, the hidden layer, and the output layer, respectively.

As illustrated in FIG. 1, the two-dimensional array circuit 200 includes a first wiring group 210, an input part 215 that inputs a signal to the first wiring group 210, a second wiring group 220 that intersects the first wiring group 210, and an output part 225 that outputs a signal from the second wiring group 220. In the present embodiment, the first wiring group 210 includes a plurality of word lines. The second wiring group 220 includes a plurality of bit lines. The memory cell is provided at an intersection of the word line and the bit line. That is, although not shown, at least one resistive random access memory (Re RAM) and at least one selection transistor are arranged as memory cells at the intersection where the first wiring group 210 and the second wiring group 220 intersect. The first wiring group 210 is preferably a wiring group formed of wiring lines parallel to each other. The second wiring group 220 is preferably a wiring group composed of wiring lines parallel to each other, and is preferably a wiring group orthogonal to the first wiring group 210.

The input part 215 is a portion that inputs information transmitted from an external circuit (including another two-dimensional array circuit 200) to the two-dimensional array circuit 200. Specifically, the information input from the input part 215 drives each word line constituting the first wiring group 210. In the present embodiment, the input part 215 is an aggregation of input terminals electrically connected to each word line. The output part 225 is a portion that outputs information from the two-dimensional array circuit 200 to an external circuit (including another two-dimensional array circuit 200). Specifically, the information transmitted via the second wiring group 220 is output through the output part 225. In the present embodiment, the output part 225 is an aggregation of output terminals electrically connected to each bit line.

Figure 2:
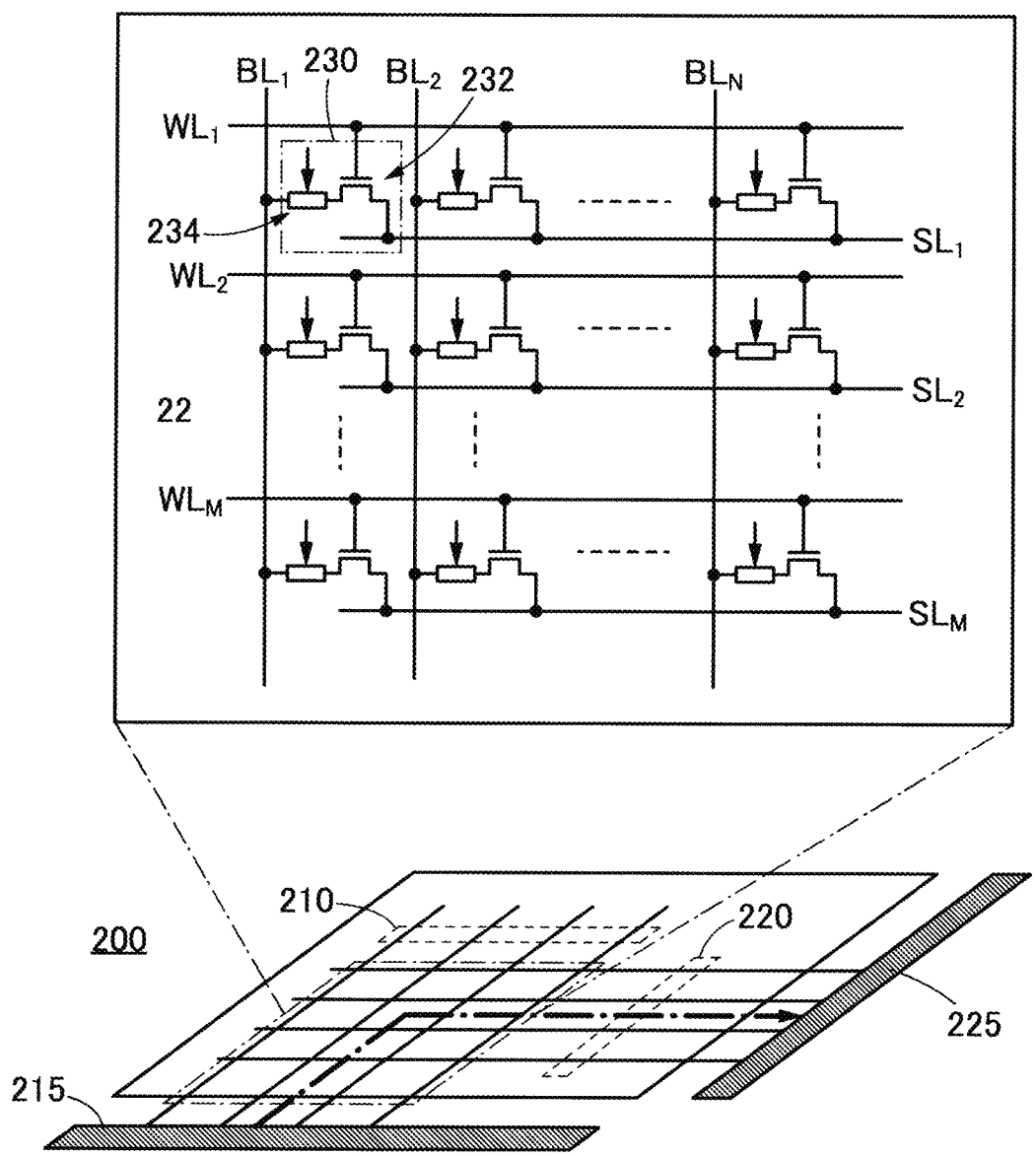
FIG. 2 is a diagram illustrating a configuration of a two-dimensional array circuit according to the first embodiment.

FIG. 2 is a diagram illustrating a configuration of the two-dimensional array circuit 200 according to the first embodiment. As shown in FIG. 2, a memory cell 230 is arranged at an intersection of a plurality of word lines WL and a plurality of bit lines BL. In the present embodiment, each memory cell 230 includes a selection transistor 232 and a resistive random access memory 234. The resistive random access memory 234 is provided between a bit line BL and the selection transistor 232. The selection transistor 232 is provided between the resistive random access memory 234 and a source line SL. A word line WL is connected to the gate of the selection transistor 232. However, the configuration of the memory cell 230 is not limited to this example. For example, the resistive random access memory 234 may be arranged between the selection transistor 232 and the source line SL.

Although not shown in FIG. 2, the two-dimensional array circuit 200 includes a peripheral circuit for reading information stored in each memory cell 230 and writing information to each memory cell 230. The peripheral circuit may include a peripheral circuit for driving the word line WL and a peripheral circuit for driving the bit line BL. That is, the input part 215 illustrated in FIG. 1 may include a peripheral circuit for driving the word line WL. Further, the output part 225 may include a peripheral circuit for driving the bit line BL. These peripherals may include at least one circuit selected from the latch circuit, buffer circuit, writing circuit, precharge circuit and amplifier circuit. The peripheral circuit can be formed by, for example, a circuit made of only n-type IGZO or a CMOS circuit including n-type IGZO and p-type tin oxide (SnO). The peripheral circuit may be formed by Si-CMOS on the control circuit 100.

The resistive random access memory 234 can store one bit of information by changing a resistance value of a CER layer indicating an electric field-induced giant resistance change (hereinafter, also referred to as a "variable resistance layer"). For example, information in a low resistance state (LRS) in which the resistance value is relatively low is set to "0", and information in a high resistance state (HRS) in which the resistance value is relatively high is set to "1". However, the correspondence relationship between the resistance value and the information of "0" or "1" may be reversed.

Each memory cell 230 is individually selected by the on/off control of the selection transistor 232. The selected memory cell 230 performs writing operation or a reading operation of information according to the voltage applied to the bit line BL and the source line SL. In the present embodiment, the word line WL is driven based on the signal input to the input part 215 of the two-dimensional array circuit 200, and the signal output from the output part 225 is determined based on the signal read from the memory cell 230 via the bit line BL.

The description is returned to FIG. 1. The two-dimensional array circuit 200*a* includes a first wiring group 210*a* connected to an input part 215*a* and a second wiring group 220*a* connected to an output part 225*a*. The two-dimensional array circuit 200*b* includes a first wiring group 210*b* connected to an input part 215*b* and a second wiring group 220*b* connected to an output part 225*b*. The two-dimensional array circuit 200*c* includes a first wiring group 210*c* connected to an input part 215*c* and a second wiring group 220*c* connected to an output part 225*c*. The two-dimensional array circuit 200*d* includes a first wiring group 210*d* connected to an input part 215*d* and a second wiring group 220*d* connected to an output part 225*d*. The two-dimensional array circuit 200*e* includes a first wiring group 210*e* connected to an input part 215*e* and a second wiring group 220*e* connected to an output part 225*e*.

The three-dimensional array device 10 of the present embodiment has a structure in which two-dimensional array circuits 200*a* to 200*e* are stacked while being rotated by 90 degrees from the lower layer toward the adjacent upper layer. Specifically, in the three-dimensional array device 10, the positions of the input part 215 and the output part 225 are changed by 90 degrees in a counterclockwise direction in a plan view. Therefore, in the three-dimensional array device 10 of the present embodiment, the input part 215 of the two-dimensional array circuit 200 on the upper layer side and the output part 225 of the two-dimensional array circuit 200 on the lower layer side are overlapped in a plan view.

Figure 3A:
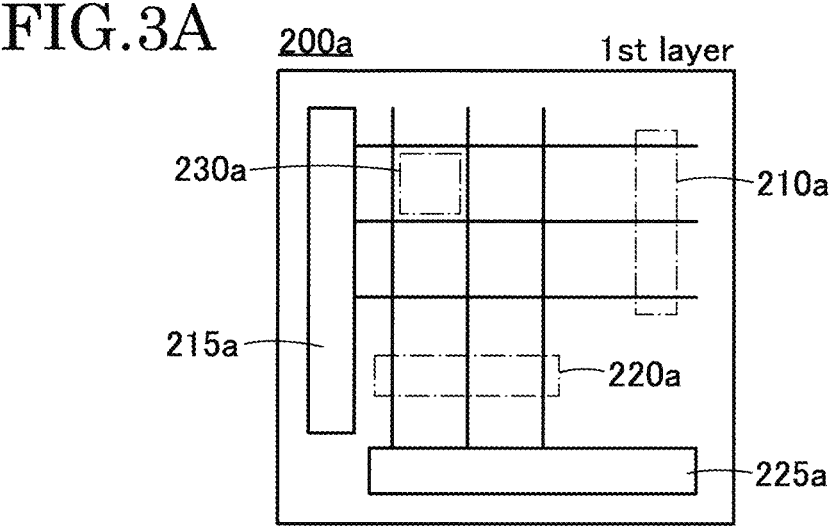
FIG. 3A is a schematic diagram showing a change in the position of an input part and an output part in the two-dimensional array circuit.
Figure 3B:
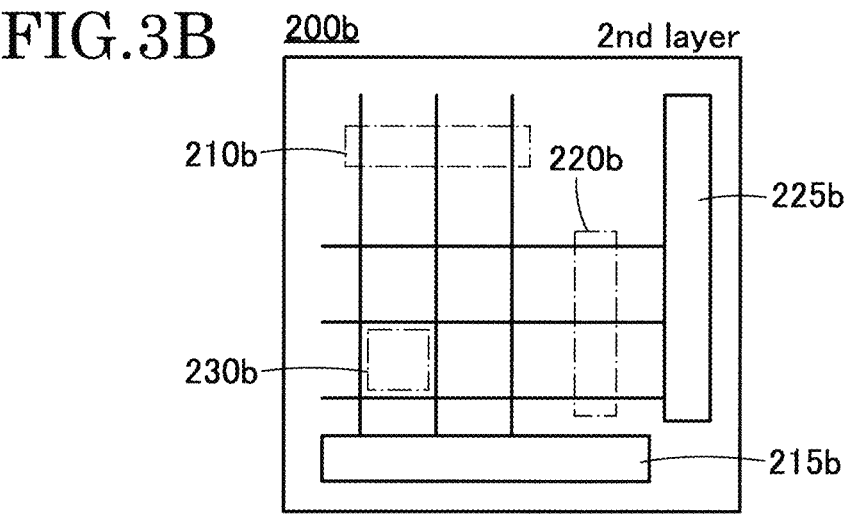
FIG. 3B is a schematic diagram showing a change in the position of the input part and the output part in the two-dimensional array circuit.
Figure 3C:
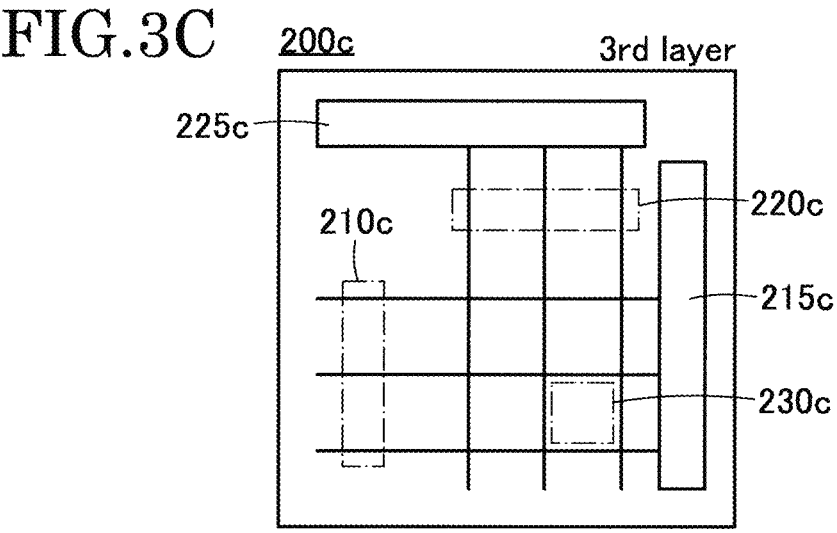
FIG. 3C is a schematic diagram showing a change in the position of the input part and the output part in the two-dimensional array circuit.

FIG. 3A, FIG. 3B and FIG. 3C are schematic diagrams illustrating a change in positions of the input part 215 and the output part 225 in the two-dimensional array circuit 200. Specifically, FIG. 3A, FIG. 3B and FIG. 3C are plan views illustrating configurations of the two-dimensional array circuit 200*a*, the two-dimensional array circuit 200*b*, and the two-dimensional array circuit 200*c*, respectively.

As shown in FIG. 1, FIG. 3A and FIG. 3B, the two-dimensional array circuit 200*b* is in a position where the two-dimensional array circuit 200*a* is rotated 90 degrees counterclockwise in a plan view. In this case, the output part 225*a* of the two-dimensional array circuit 200*a* overlaps with the input part 215*b* of the two-dimensional array circuit 200*b*. As shown in FIG. 1, FIG. 3B and FIG. 3C, the two-dimensional array circuit 200*c* is in a position where the two-dimensional array circuit 200*b* is rotated 90 degrees counterclockwise in a plan view. In this case, the output part 225*b* of the two-dimensional array circuit 200*b* overlaps with the input part 215*c* of the two-dimensional array circuit 200*c*. Although not shown, the relationship between the two-dimensional array circuit 200*c* and the two-dimensional array circuit 200*d* and the relationship between the two-dimensional array circuit 200*d* and the two-dimensional array circuit 200*e* are the same.

As described above, in the three-dimensional array device 10 of the present embodiment, the positions of the input part 215 and the output part 225 are changed spirally from the lower layer toward the upper layer. Specifically, the three-dimensional array device 10 has a structure in which the two-dimensional array circuit on the upper layer side is arranged at a position where the two-dimensional array circuit on the lower layer side is rotated by 90 degrees counterclockwise from the lower layer toward the upper layer. In this case, the signal input to the three-dimensional array device 10 is calculated while proceeding from the lower layer toward the upper layer. However, the structure of the three-dimensional array device 10 is not limited to this example. For example, the three-dimensional array device 10 may have a structure in which the two-dimensional array circuit on the lower layer side is arranged at a position where the two-dimensional array circuit on the upper layer side is rotated 90 degrees clockwise from the upper layer toward the lower layer. That is, the output part 225 of the two-dimensional array circuit 200 on the upper layer side is electrically connected to the input part 215 of the two-dimensional array circuit 200 on the lower layer side. In this case, the signal input to the three-dimensional array device 10 is calculated while proceeding from the upper layer toward the lower layer.

Further, as indicated by arrows in FIG. 1, the output of the two-dimensional array circuit 200 on the lower layer side becomes the input of the two-dimensional array circuit 200 on the upper layer side. That is, the output part 225 of the two-dimensional array circuit 200 on the lower layer side is electrically connected to the input part 215 of the two-dimensional array circuit 200 on the upper layer side. At this time, any method may be used for electrical connection between the input part 215 of the two-dimensional array circuit 200 on the upper layer side and the output part 225 of the two-dimensional array circuit 200 on the lower layer side. For example, as the electrical connection method, a connection by a via connecting the wiring layers formed in the previous step, a connection by TSV (Through-Silicon Via), or the like may be used. Further, electrically connecting the input part 215 and the output part 225 includes electrically connecting a peripheral circuit (such as a peripheral circuit for driving the word line WL) included in the input part 215 and a peripheral circuit included in the output part 225 (such as a peripheral circuit for driving the bit line BL). Here, an example has been shown in which the output part 225 of the two-dimensional array circuit 200 on the lower layer side and the input part 215 of the two-dimensional array circuit 200 on the upper layer side are electrically connected by vias between wiring layers formed in the previous step, or electrically connected by TSVs, but the present invention is not limited to this example. For example, the output part 225 and the input part 215 can be optically connected by Through-Silicon Photonic Via (TSPV) by providing surface emitting lasers at the output part 225 of the two-dimensional array circuit 200 on the lower layer side and providing light receiving elements at the input part 215 of the two-dimensional array circuit 200 on the upper layer side. Alternatively, a method using wireless radio connection by electric or magnetic field coupling with inductors in the lower and upper layers may be used.

In the present embodiment, since the output part 225 of the two-dimensional array circuit 200 on the lower layer side and the input part 215 of the two-dimensional array circuit 200 on the upper layer side are overlapped in the vertical direction, the wiring length between the output part 225 and the input part 215 can be minimized. That is, with this structure, it is possible to provide the three-dimensional array device 10 that can suppress an increase in signal delay and power consumption caused by the wiring length, and realizes a neural network with low latency and low energy loss, as compared with the prior art.

[Configuration of Memory Cell]

Figure 4:
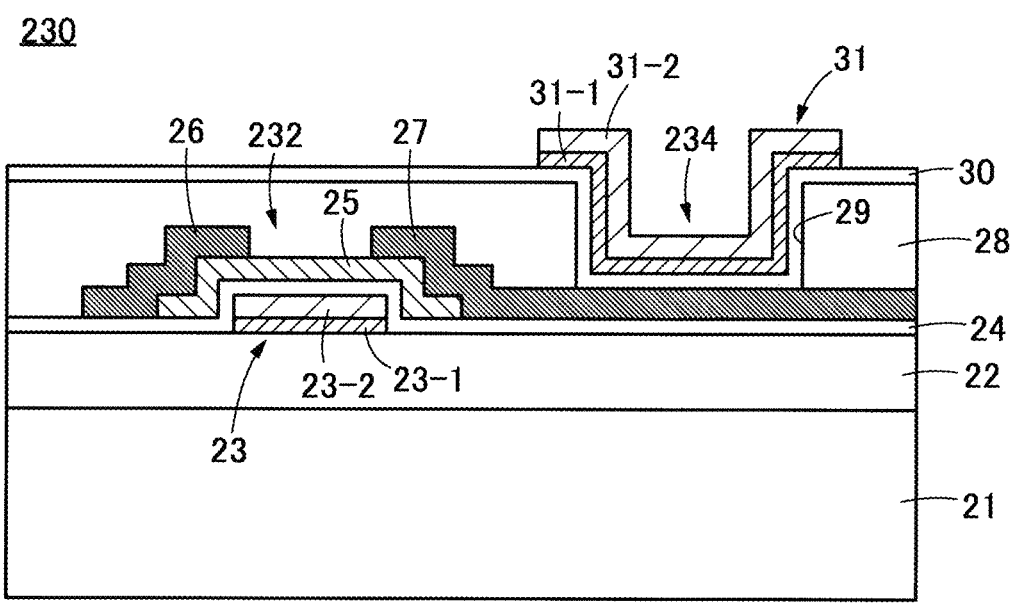
FIG. 4 is a cross-sectional view illustrating a configuration of a memory cell in a three-dimensional array device according to the first embodiment.

FIG. 4 is a cross-sectional view showing a configuration of the memory cell 230 in the three-dimensional array device 10 according to the first embodiment. As described above, in the present embodiment, the memory cell 230 includes the selection transistor 232 and the resistive random access memory 234. However, the configuration illustrated in FIG. 4 is an example, and is not limited to this example.

In FIG. 4, a substrate 21 functions as a base that supports the selection transistor 232 and the resistive random access memory 234. In this embodiment, as the substrate 21, a silicon substrate is used, but other substrates such as glass substrates, resin substrates, metal substrates, ceramic substrates, and the like may be used. When the substrate 21 is a silicon substrate, an integrated circuit made of a silicon CMOS may be formed. An insulating layer 22 functions as an underlayer. In the present embodiment, a silicon oxide layer is used as the insulating layer 22, but the present invention is not limited to this example.

A gate electrode 23 is provided on the insulating layer 22. The gate electrode 23 functions as a bottom gate of the selection transistor 232 and also functions as the word line WL illustrated in FIG. 2. The gate electrode 23 has a stacked structure of a first metal layer 23-1 made of titanium (Ti) and a second metal layer 23-2 made of titanium nitride (TiN). In the present embodiment, the film thickness of the first metal layer 23-1 is 5 nm and the film thickness of the second metal layer 23-2 is 20 nm, but the present invention is not limited to this example. In addition, the gate electrode 23 may have a single-layer structure or may be formed using another metal layer. For example, as the material of the gate electrode 23, a metal material containing tungsten (W), tantalum (Ta), molybdenum (Mo), aluminum (Al), copper (Cu), or the like, or a compound material containing these metal materials may be used. The gate electrode 23 can be formed by a sputtering method, for example.

A gate insulating layer 24 is made of hafnium oxide. However, the present invention is not limited thereto, and a dielectric layer containing an oxide or a nitride such as silicon or aluminum may be used as the gate insulating layer 24. The gate insulating layer 24 can be formed using, for example, ALD (Atomic Layer Deposition) method at 250° C. In the present embodiment, the thickness of the gate insulating layer 24 is 8 nm, but the present invention is not limited to this example.

A channel layer 25 functions as a channel of the selection transistor 232. In the present embodiment, a metal oxide called IGZO is used as a component of the channel-layer 25. IGZO is a metal oxide that exhibits semiconductor properties and is a compound composed of indium (In), gallium (Ga), zinc (Zn), and oxygen. Specifically, IGZO is an oxide comprising In, Ga and Zn, or mixtures of such oxides. IGZO is preferably $In_{2-x}Ga_xO_3(ZnO)_m$ (0<x<2, where m is a natural number 0 or less than 6), more preferably $InGaO_3(ZnO)_m$ (where m is a natural number 0 or less than 6), and most preferably $InGaO_3$ (ZnO). When IGZO is amorphous, since it can be a mixture of compounds with different m microscopically, m does not have to be an integer macroscopically. In the present embodiment, an 8 nm thick IGZO film is used as the channel layer 25. IGZO film can be formed by the sputtering method at room temperature. Instead of IGZO, other oxide semiconductors, for example, an oxide containing In, an oxide containing Zn, an oxide containing Sn, an oxide containing In and Zn, an oxide containing In and Sn, an oxide containing Sn and Zn, an oxide containing In, Sn and Zn, or an oxide composed of another element can be used as a material for forming the channel layer.

In the present embodiment, the gate insulating layer 24 is formed of a dielectric layer, and the channel layer 25 is formed of a IGZO film. Therefore, formation of an interface layer having a low dielectric constant at the interface between the gate insulating layer 24 and the channel layer 25 is suppressed, and deterioration in transistor properties can be suppressed. Such a low dielectric constant interface layer may be formed between the gate insulating layer 24 and the channel layer 25 when the channel layer is silicon.

Each of a source electrode 26 and a drain electrode 27 functions as a connection terminal for obtaining an electrical connection with the channel layer 25. In the present embodiment, a titanium nitride layer having a film thickness of 20 nm is used as the source electrode 26 and the drain electrode 27. The titanium nitride layer can be formed by, for example, the sputtering method. However, the present invention is not limited to this example, and the source electrode 26 and the drain electrode 27 may be formed using another metal material. Note that the functions of the source electrode 26 and the drain electrode 27 may be reversed in accordance with voltages applied to the source electrode and the drain electrode. That is, the source electrode 26 may function as a drain electrode, and the drain electrode 27 may function as a source electrode. Note that the drain electrode 27 functions as a bottom electrode of the resistive random access memory 234, as will be described later.

The selection transistor 232 is covered with an insulating layer 28. In the present embodiment, the insulating layer 28 is a silicon oxide layer having a thickness of 200 nm. The insulating layer 28 can be formed by, for example, a plasma CVD method or the sputtering method. As will be described later, the three-dimensional array device 10 of the present embodiment has a structure in which a plurality of memory cell array circuits are stacked. Therefore, the insulating layer 28 has a function of isolating and separating the memory cell array circuit on the lower layer side from the memory cell array circuit on the upper layer side. The insulating layer 28 also functions as a passivation layer that protects the channel layer 25 of the selection transistor 232 from moisture and the like. Furthermore, the insulating layer 28 also functions as a planarization layer for planarizing the relief caused by the selection transistor 232. However, the material constituting the insulating layer 28 is not limited to silicon oxide, and other insulating materials (for example, an inorganic material such as silicon nitride or a resin material such as polyimide or acrylic) can be used.

The insulating layer 28 has an opening 29. The opening 29 is provided on the drain electrode 27 and exposes the surface of the drain electrode 27. The opening 29 can be formed by photolithography and etching, for example. In the present embodiment, the diameter of the opening 29 is set to 3 μm, but the present invention is not limited to this example.

A variable resistance layer 30 is provided on the side wall and the bottom of the opening 29. The variable resistance layer 30 is formed of a dielectric layer containing hafnium oxide, and functions as a CER layer of the resistive random access memory 234. In the present embodiment, the variable resistance layer 30 is used without patterning the dielectric layer, but the variable resistance layer 30 may be processed into a pattern covering the opening 29.

A top electrode 31 is provided on the variable resistance layer 30 so as to cover the opening 29. The top electrode 31 functions as an electrode of the resistive random access memory 234 and also functions as the bit line BL illustrated in FIG. 2. In the present embodiment, the top electrode 31 is formed of the same metal layer as the gate electrode 23 of the selection transistor 232 in the memory cell array circuit on the upper layer side. That is, the top electrode 31 and the gate electrode 23 of the selection transistor 232 in the memory cell array circuit arranged in the upper layer are elements of the same layer. Therefore, the top electrode 31 has a stacked structure of a first metal layer 31-1 made of titanium (Ti) and a second metal layer 31-2 made of titanium nitride (TiN). In this case, as in the case of the gate electrode 23, for example, it can be formed by the sputtering method.

As described above, the resistive random access memory 234 including the bottom electrode (a part of the drain electrode 27), the variable resistance layer 30, and the top electrode 31 is formed inside the opening 29 provided in the insulating layer 28. The resistive random access memory 234 is connected to the selection transistor 232 via the drain electrode 27. As illustrated in FIG. 2, the memory cell 230 described above includes the selection transistor 232 having the word line WL as a gate, and the resistive random access memory 234 disposed between the selection transistor 232 and the bit line BL.

The three-dimensional array device 10 of the present embodiment is configured by stacking the memory cell array circuits (two-dimensional array circuits 200) in which the above-described memory cells 230 are arranged in an array. Specifically, the three-dimensional array device 10 has a device structure in which the memory cells 230 illustrated in FIG. 4 are stacked in a vertical direction.

Figure 5:
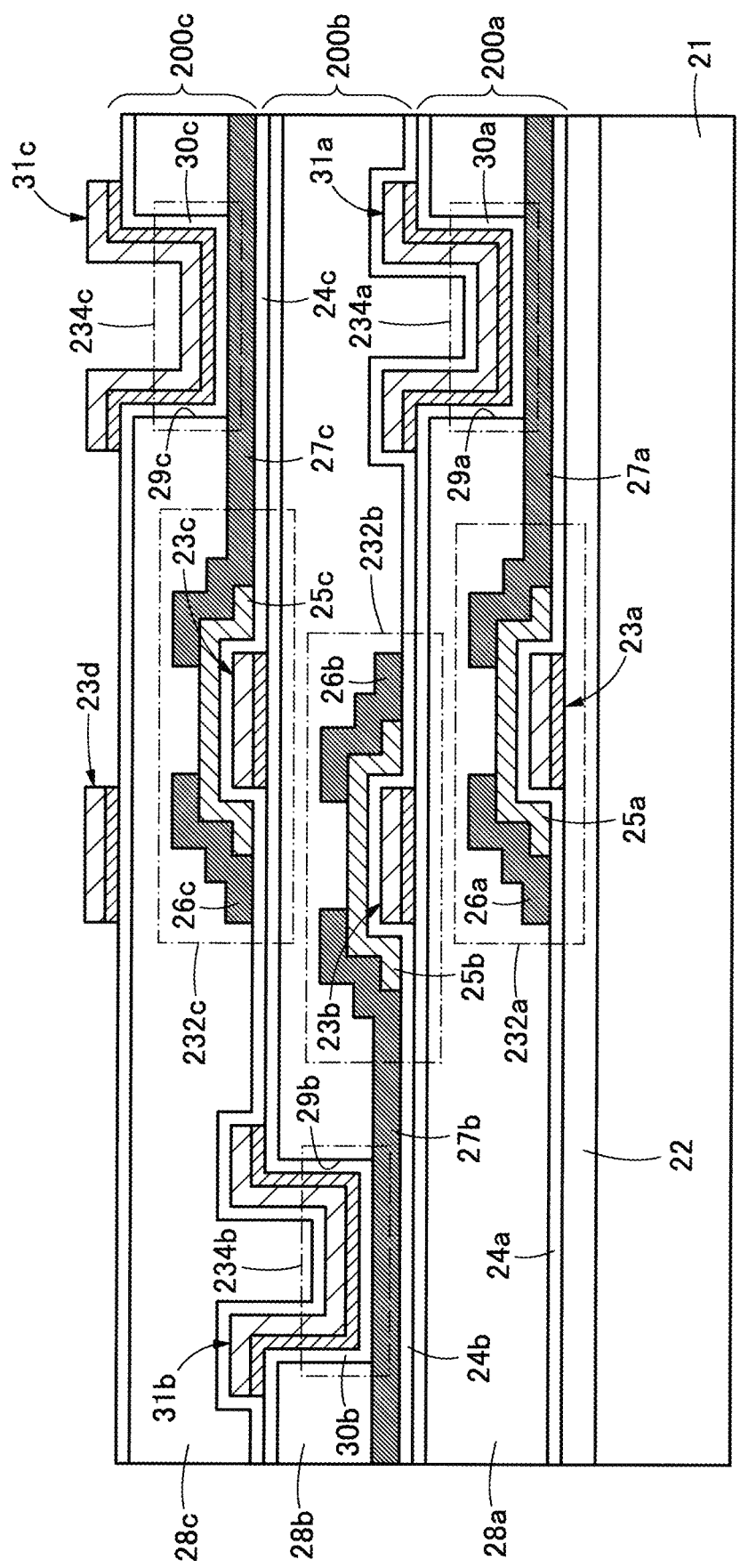
FIG. 5 is an enlarged cross-sectional view showing a configuration of the three-dimensional array device of the first embodiment.

FIG. 5 is an enlarged cross-sectional view illustrating a configuration of the three-dimensional array device 10 according to the first embodiment. Specifically, two-dimensional array circuits 200a to 200c are formed on the substrate 21. As shown in FIG. 5, the two-dimensional array circuits 200a to 200c are stacked on the substrate 21 using a thin film forming process. At this time, selection transistors 232a to 232c of the two-dimensional array circuits 200a to 200c are isolated by means of insulating layers 28a to 28c, respectively.

As shown in FIG. 5, a top electrode 31a of a resistive random access memory 234a of the two-dimensional array circuit 200a is formed of a metal layer that is the same layer as a gate electrode 23b of a selection transistor 232b of the two-dimensional array circuit 200b. That is, the top electrode 31a and the gate electrode 23b are elements of the same layer formed of a metal layer having the same structure and the same material. Similarly, a top electrode 31b of the resistive random access memory 234b of the two-dimensional array circuit 200b is formed of the same metal layer as the gate electrode 23c of the selection transistor 232c of the two-dimensional array circuit 200c. In other words, in the present embodiment, the bit line BL (the second wiring group 220) of the two-dimensional array circuit 200 on the lower layer side and the word line WL (the first wiring group 210) of the two-dimensional array circuit 200 on the upper layer side are formed of the same metal layer.

Figure 6:
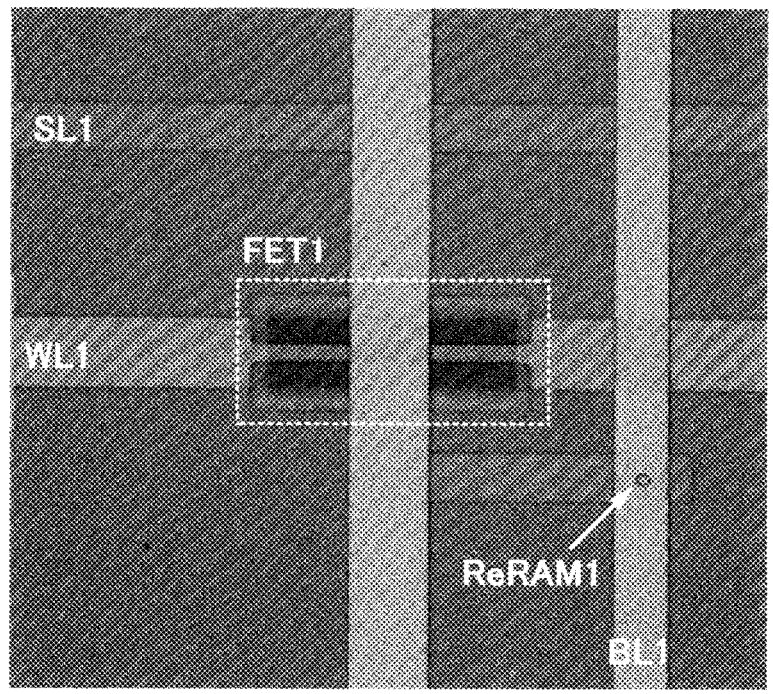
FIG. 6 is a drawing substitute photograph showing a layout of the memory cells of the two-dimensional array circuit shown in the drawing 3A.
Figure 7:
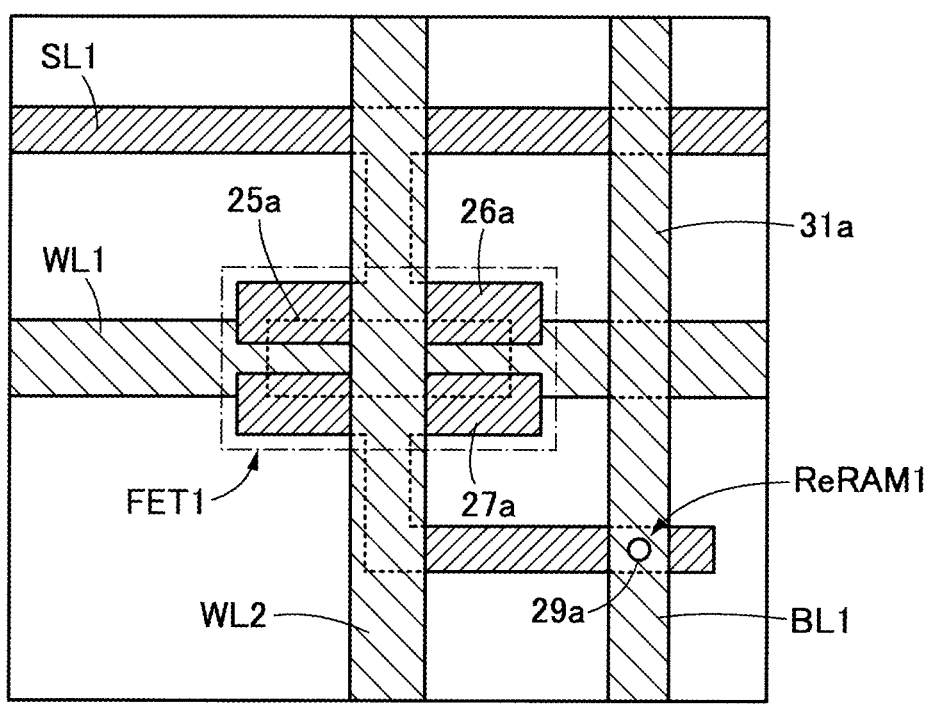
FIG. 7 is a plan view schematically showing the layout of the memory cell shown in FIG. 6.

FIG. 6 is a drawing substitute photograph showing the layout of the two-dimensional array circuitry 200a shown in the FIG. 3A in the memory cell 230a. FIG. 7 is a plan view schematically showing the layout of the memory cell 230a shown in FIG. 6.

In FIG. 6 and FIG. 7, a word line WL1 corresponds to the gate electrode 23a of FIG. 5, and a bit line BL1 corresponds to the top electrode 31a of FIG. 5. The memory cell 230a has FET1 and ReRAM 1 at the intersection of the word-line WL1 and the bit line BL1. As described with reference to FIG. 5, ReRAM 1 is located inside an opening 29a provided in the insulating layers 28a. In FIG. 6, a circular portion indicated by an arrow corresponds to the opening 29a. However, the shape of the opening 29a is not limited to this example, and may be a polygon.

A source line SL1 extends parallel to the word line WL1. As shown in FIG. 7, the source line SL1 is formed integrally with the source electrode 26a of FET1 (the selection transistor 232a in FIG. 5). The bottom electrode of ReRAM 1 (resistive random access memory 234a in FIG. 5) is formed integrally with the drain electrode 27a of FET1 (selection transistor 232a in FIG. 5). The word line WL2 is a wiring formed in the same layer as the bit line BL1, and corresponds to the gate electrode 23b of the selection transistor 232b in FIG. 5.

Figure 8:
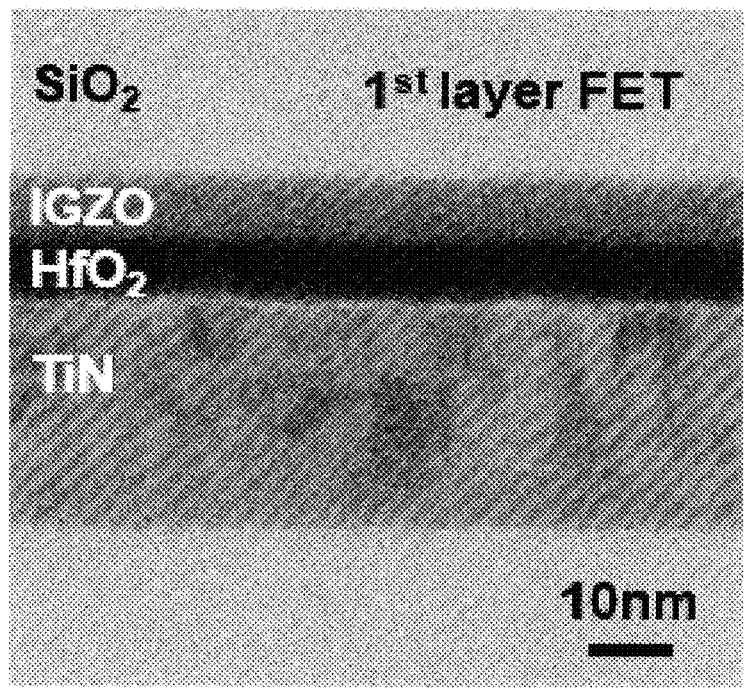
FIG. 8 is a drawing substitute photograph of a cross-section of FET1 shown in FIG. 6 near a channel.

FIG. 8 is a drawing substitute photograph of a cross-section of FET1 shown in FIG. 6 in the vicinity of channels. Specifically, FIG. 8 shows a cross-sectional structure in the vicinity of the channel in the selection transistor 232a shown in FIG. 5. As shown in FIG. 8, a titanium nitride layer constituting the gate electrode 23a, a dielectric layer containing hafnium oxide constituting the gate insulating layer 24a, an IGZO layer constituting the channel layer 25a, and a silicon oxide layer constituting the insulating layer 28a are uniformly formed in this order from the lower layer.

Figure 9:
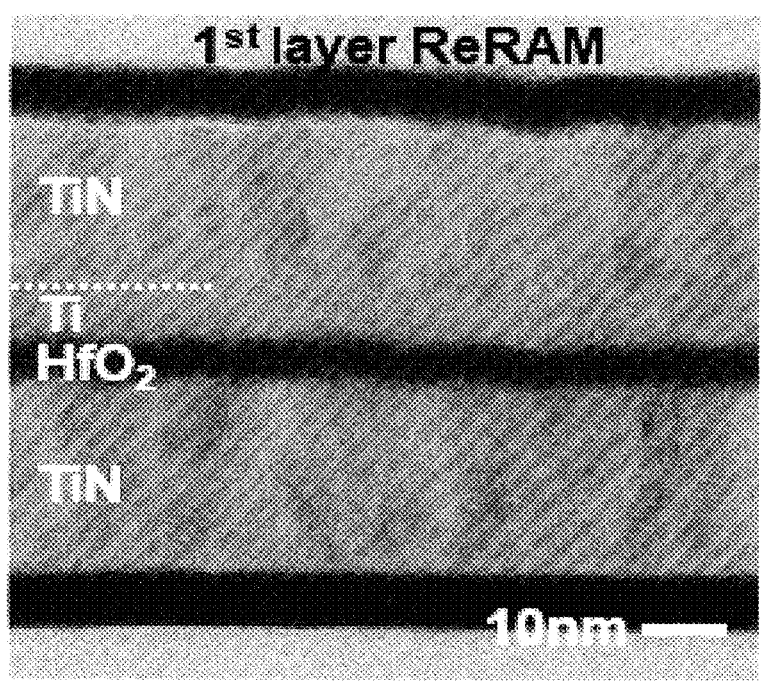
FIG. 9 is a drawing substitute photograph showing a cross-sectional configuration of ReRAM 1 shown in FIG. 6.

FIG. 9 is a drawing substitute photograph showing a cross-sectional configuration of ReRAM 1 shown in FIG. 6. Specifically, FIG. 9 shows a cross-sectional structure of the resistive random access memory 234a shown in FIG. 5. As shown in FIG. 9, a titanium nitride layer constituting the drain electrode 27a, a dielectric layer containing hafnium oxide constituting the variable resistance layer 30a, and a titanium layer and a titanium nitride layer constituting the top electrode 31a are uniformly formed in this order from the lower layer. As will be described later, in the present embodiment, a structure in which a titanium layer and a dielectric layer containing hafnium oxide are in contact with each other is adopted, whereby a filament formed by oxygen vacancies is formed inside the dielectric layer.

Figure 10:
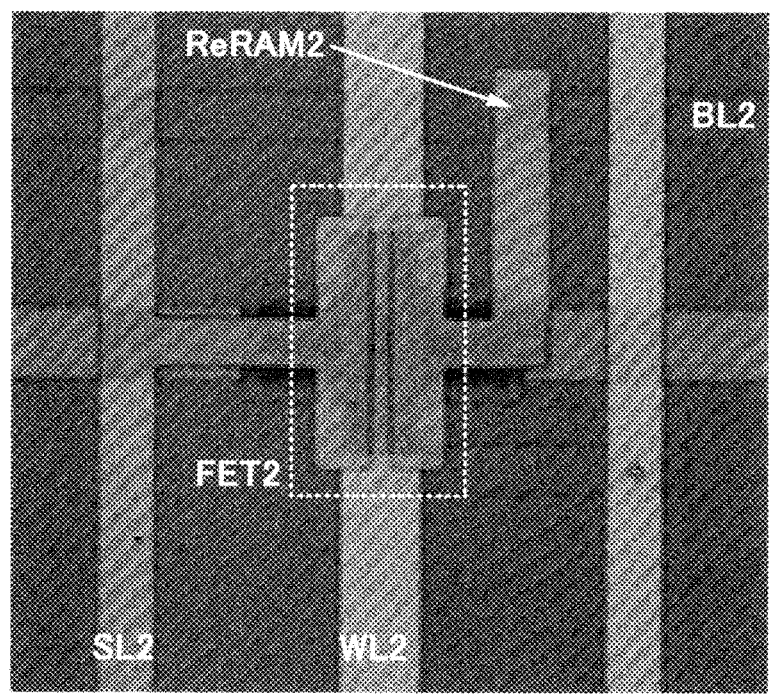
FIG. 10 is a drawing substitute photograph showing the layout of the memory cells of the two-dimensional array circuit shown in FIG. 3B.
Figure 11:
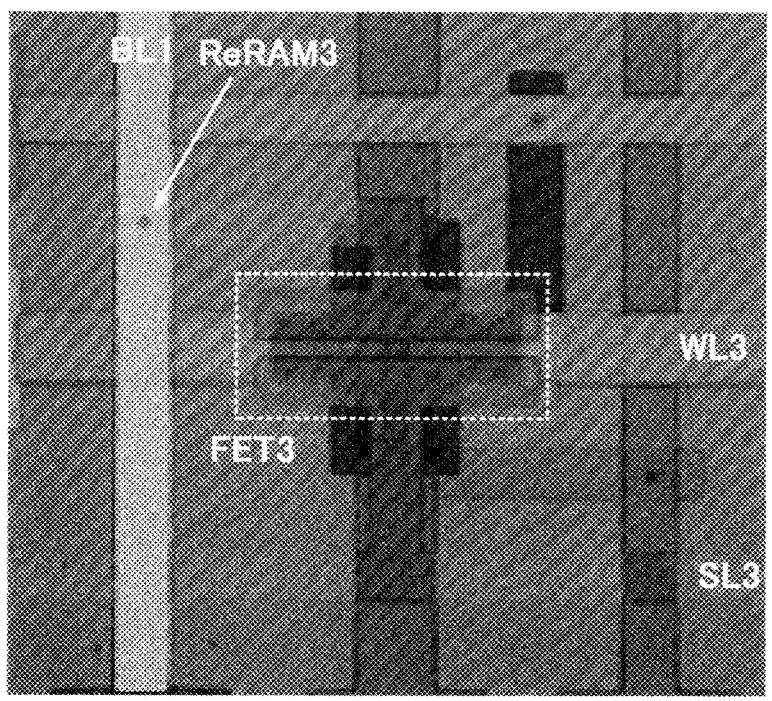
FIG. 11 is a drawing substitute photograph showing the layout of the memory cells of the two-dimensional array circuit shown in FIG. 3C.

FIG. 10 is a drawing substitute photograph showing the layout of the memory cells 230b of the two-dimensional array circuit 200b shown in the FIG. 3B. FIG. 11 is a drawing substitute photograph showing the layout of the two-dimensional array circuit 200c shown in the FIG. 3C in the memory cell 230c. The memory cell 230a shown in FIG. 6 is arranged under the memory cell 230b shown in FIG. 10. In the lower layer of the memory cell 230c shown in FIG. 11, the memory cell 230a shown in FIG. 6 and the memory cell 230b shown in FIG. 10 are arranged in this order from the lower layer. The layouts shown in FIG. 6, FIG. 10, and FIG. 11 correspond to FIG. 3A, FIG. 3B, and FIG. 3C, respectively, and have positional relationships rotated by 90 degrees counterclockwise in a plan view.

As described above, the three-dimensional array device 10 of the present embodiment is configured by stacking a plurality of two-dimensional array circuits 200 (a plurality of memory cell circuits) using a normal thin-film forming process. In the present embodiment, since an IGZO layer that can be formed at room temperature is used as the channel layer 25 of the selection transistor 232, the three-dimensional array device 10 can be formed at a low temperature of 400° C. or less. In addition, the selection transistor 232 using IGZO layer as the channel layer 25 has a field-effect mobility enough to drive the memory cell 230. Therefore, according to the present embodiment, it is possible to provide the three-dimensional array device 10 that realizes in-memory computing in an AI application using the deep neural network.

[Characteristics of Three-Dimensional Array Device]

Characteristics of the selection transistor 232 or the resistive random access memory 234 constituting the three-dimensional array device 10 of the present embodiment are described below.

Figure 12:
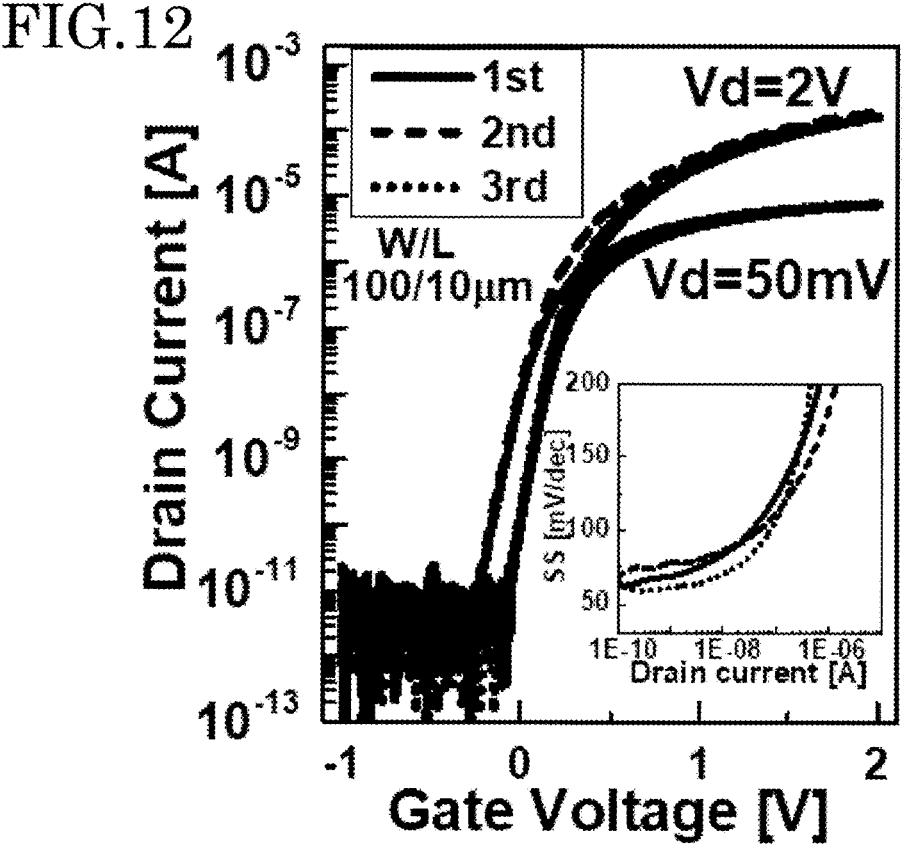
FIG. 12 is a diagram illustrating Id-Vg characteristics of a selection transistor in the three-dimensional array device of the first embodiment.

FIG. 12 is a diagram showing Id-Vg characteristics of the selection transistors 232a to 232c in the three-dimensional array device 10 of the first embodiment. "First" indicates the characteristics of the selection transistor 232a in the first two-dimensional array circuit 200a illustrated in FIG. 6. "Second" indicates the characteristics of the selection transistor 232b in the second two-dimensional array circuit 200b illustrated in FIG. 10. "Third" indicates the characteristics of the selection transistor 232c in the third two-dimensional array circuit 200c illustrated in FIG. 11. The source-drain voltage (Vd) was set at 50 mV or 2V. The channel width and the channel length were set to 100 µm and 10 µm, respectively. FIG. 12 also shows the subthreshold factor (SS) obtained from Id-Vg characteristics.

Figure 13:
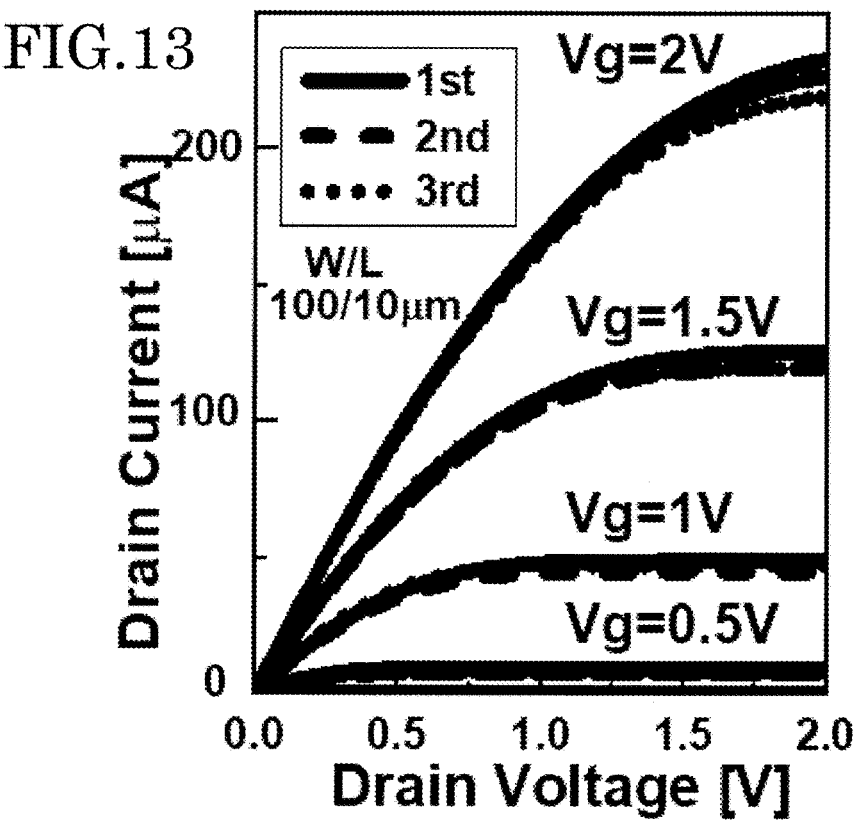
FIG. 13 is a diagram illustrating Id-Vd characteristics of a selection transistor in the three-dimensional array device of the first embodiment.

FIG. 13 is a diagram showing Id-Vd characteristics of the selection transistors 232a to 232c in the three-dimensional array device 10 of the first embodiment. The meanings of "1st", "2nd", and "3rd" are the same as those in FIG. 12. The channel width and channel length were set to 100 µm and 10 µm, respectively. The gate voltage (Vg) was set at 0.5V, 1V, 1.5V or 2V.

As shown in FIG. 12 and FIG. 13, the selection transistors 232a to 232c all exhibit substantially the same transfer characteristics and output characteristics, and no deterioration due to the three-dimensional integration process is observed. Each of the selection transistors 232a to 232c realizes a driving current of 200 µA or more. As described above, in the present embodiment, by using transistors having a small off-state current, a large on-off ratio, and a sufficiently large current driving force (specifically, transistors having an IGZO layer as a channel layer) as the selection transistors 232a to 232c, memory cells with excellent switching characteristics can be constructed.

Figure 14:
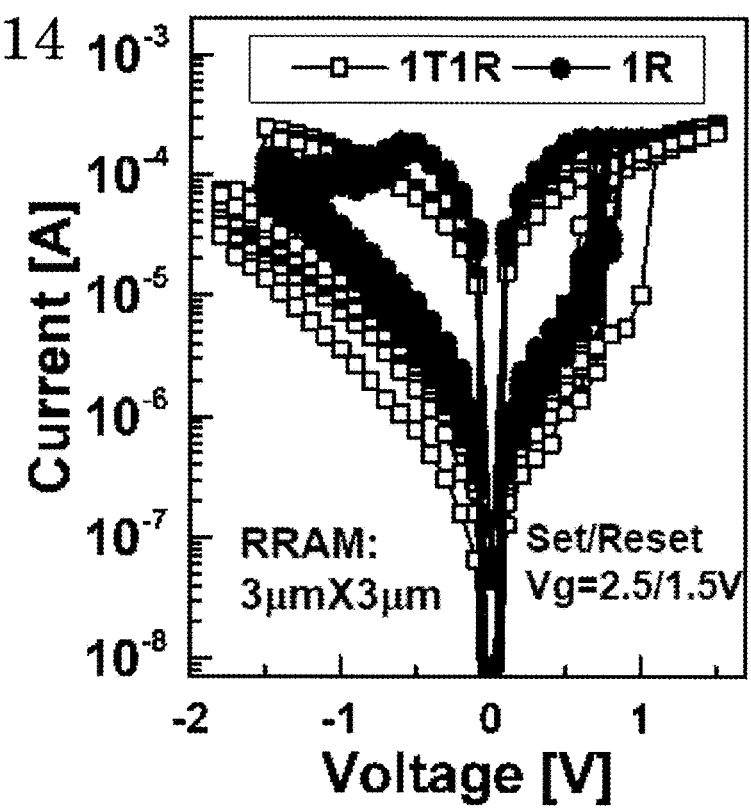
FIG. 14 is a diagram comparing the I-V characteristics of a "1T1R" cell, which is a memory cell composed of a selection transistor and a ReRAM, and the I-V characteristics of a "1R" cell, which is a memory cell composed only of a ReRAM.

FIG. 14 is a diagram comparing the I-V characteristics of a memory cell composed of the selection transistor 232 and ReRAM 234 (hereinafter referred to as a "1T1R" cell) and the I-V characteristics of a memory cell composed of only a ReRAM 234 (hereinafter referred to as a "1R" cell). The I-V characteristics of both the "1T1R" cell and the "1R" cell are overlapped and represented by a plurality of measurements, indicating variations between measurement cycles. Here, the voltage is applied to the top electrode 31 by grounding the source electrode 26, and the sweep range of the set/reset voltage of 1R cell is 1V/−1.5V, and the sweep range of the set/reset voltage of 1T1R cell is 1.5V/−1.8V. In FIG. 14, the size of ReRAM 234 was set to 3 µm×3 µm for each memory cell. In the selection transistor 232 of 1T1R cell, the gate voltage at the time of the set/reset operation is set to 2.5/1.5V.

As shown in FIG. 14, the on-current of the "1T1R" cell is less than the on-current of the "1R" cell. In the "1T1R" cell, the select transistor 232 connected to ReRAM 234 acts as a series resistor. Therefore, the reason why the on-state current of the "1T1R" cell was measured to be relatively small is considered to be the effect of the series resistor caused by the selection transistor 232.

Figure 15:
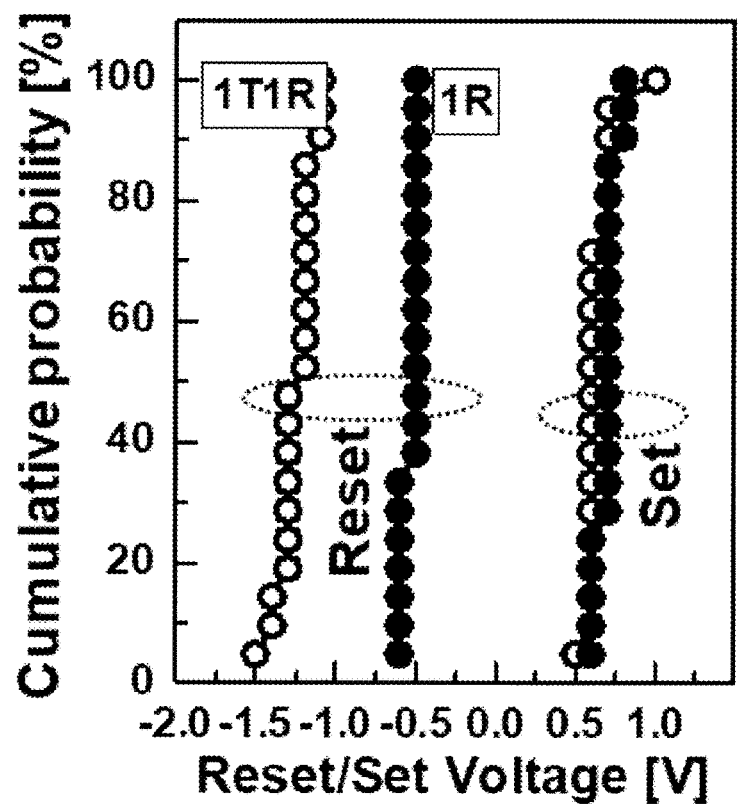
FIG. 15 is a diagram showing the cumulative probabilities of set/reset voltages of "1T1R" cells and "1R" cells measured from the I-V characteristics shown in FIG. 14.

FIG. 15 is a diagram showing the cumulative probabilities of set/reset voltages of "1T1R" cells and "1R" cells measured from the I-V characteristics shown in FIG. 14. FIG. 15 shows the variation between measuring cycles of the set/reset voltages of the "1T1R" and "1R" cells. As shown in FIG. 15, there was little difference in the set voltage between the "1T1R" cell and the "1R" cell. However, with respect to the reset voltage, the "1T1R" cell showed a larger absolute reset voltage than the "1R" cell. This is because, since ReRAM 234 is in the high resistance state at the time of setting, the voltage drop caused by the selection transistor 232 can be ignored, but since ReRAM 234 is in the low resistance state at the time of resetting, the series resistance caused by the selection transistor 232 cannot be ignored with respect to the resistance of ReRAM 234. Therefore, it is desirable to increase the field-effect mobility of the select transistor 232 to lower the series resistivity for low-voltage operation and area reduction of the "1T1R" cell.

Figure 16:
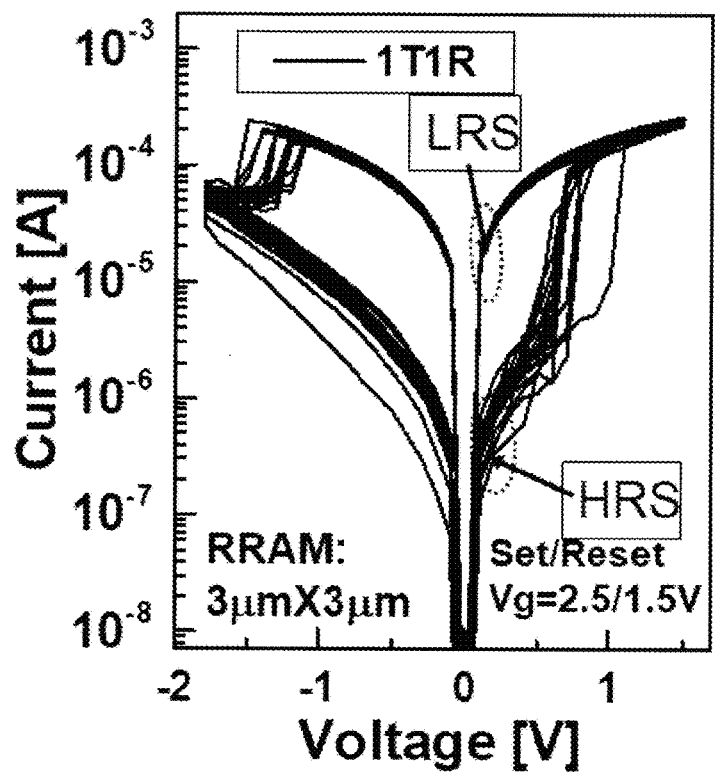
FIG. 16 is a diagram obtained by extracting the I-V characteristics of the "1T1R" cell from the I-V characteristics shown in FIG. 14.
Figure 17:
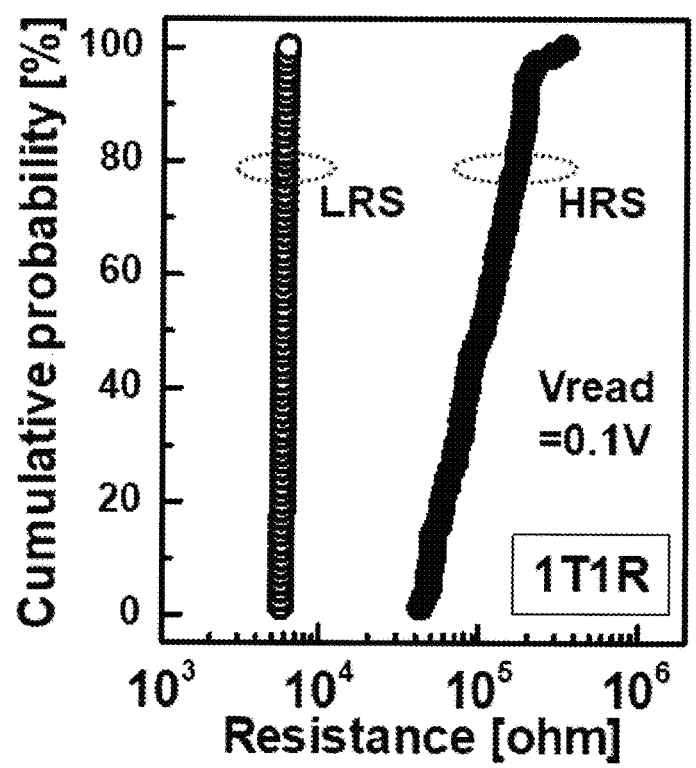
FIG. 17 is a diagram showing the cumulative probabilities of the resistance values in the low resistance state and the high resistance state of the "1T1R" cell measured from the I-V characteristics shown in FIG. 16.

FIG. 16 is a diagram obtained by extracting the I-V characteristics of the "1T1R" cell from the I-V characteristics shown in FIG. 14. As shown in FIG. 16, the "1T1R" cell is in a low resistance state in the region indicated by "LRS" and in a high resistance state in the region indicated by "HRS". FIG. 17 is a diagram showing the cumulative probabilities of the resistance values in the low resistance state and the high resistance state of the "1T1R" cell measured from the I-V characteristics shown in FIG. 16. FIG. 17 shows the variation of the resistivity of a "1T1R" cell between measuring cycles. The read voltage was set to 0.1V.

As can be seen from FIG. 16 and FIG. 17, the I-V characteristics of the "1T1R" cell show variations between measuring cycles in the high-resistance state. On the other hand, the resistance value in the low-resistance state shows a substantially uniform distribution. This phenomenon is considered to be caused by variations in the dissociation of filaments in the high-resistance state.

Figure 18:
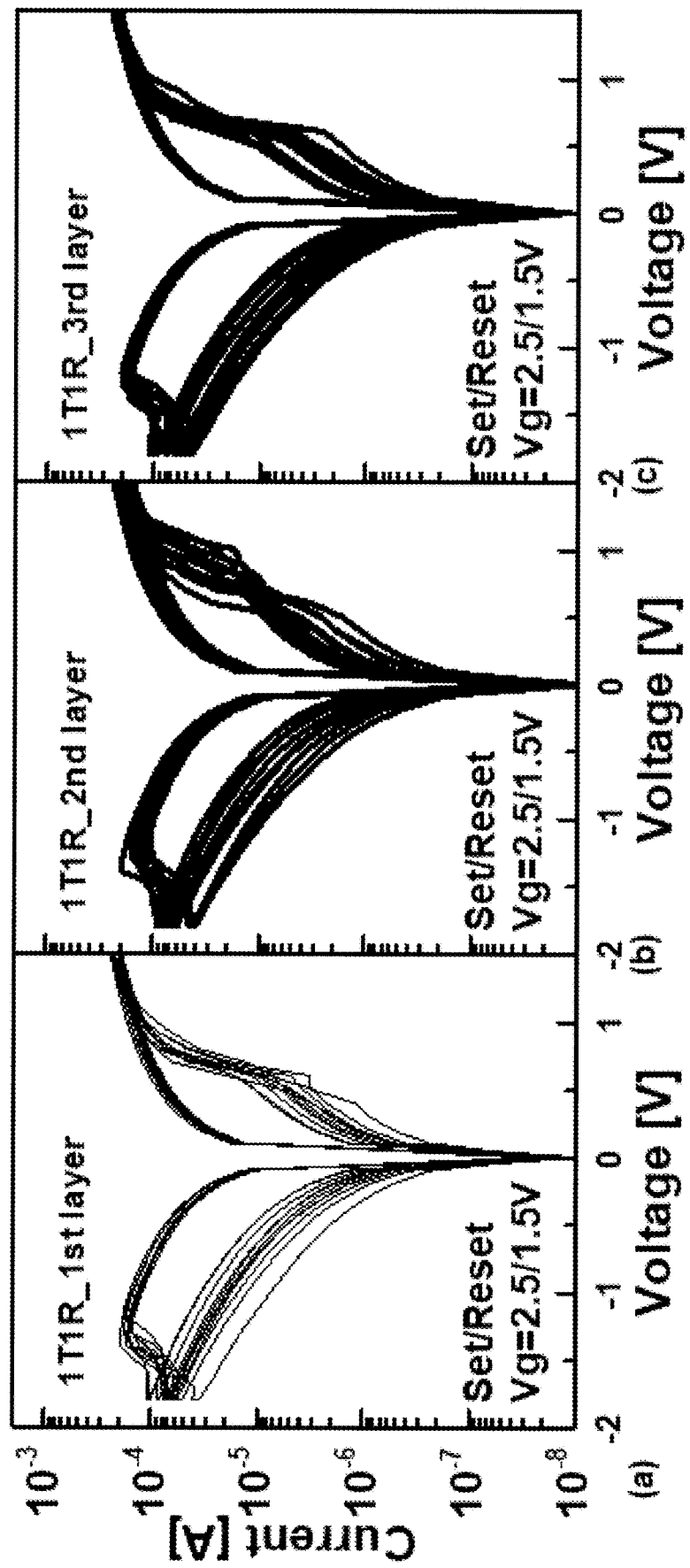
FIG. 18 is a diagram showing I-V characteristics of a "1T1R" cell in the two-dimensional array circuit.

FIG. 18 is a diagram showing the I-V characteristics of the "1T1R" cells in the two-dimensional array circuits 200a-200c. In FIG. 18, "1st layer," "2nd layer," and "3rd layer" refer to the two-dimensional array circuits 200a-200c, respectively. Each of the I-V characteristics shown in FIG. 18 is a graph obtained by plotting an average value of results obtained by measuring a plurality of times per single device against 11 devices. That is, the variation in the I-V characteristic illustrated in FIG. 18 indicates the variation between eleven devices. In FIG. 18, the gate voltage during the set/reset operation is set to 2.5/1.5V. As shown in FIG. 18, there was no significant difference in I-V characteristics between the two-dimensional array circuits 200a to 200c.

Figure 19:
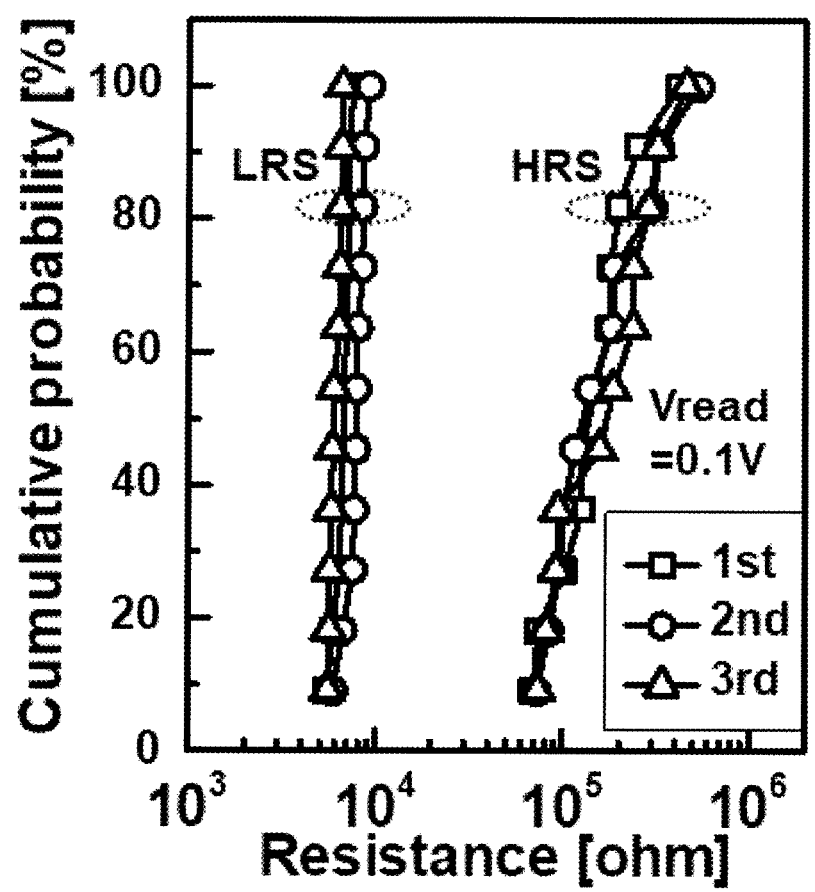
FIG. 19 is a diagram showing the cumulative probabilities of resistance values in the low resistance state and the high resistance state measured from the I-V characteristics of the two-dimensional array circuit shown in FIG. 18.

FIG. 19 is a diagram showing the cumulative probabilities of resistance values in the low resistance state and the high resistance state measured from the I-V characteristics of the two-dimensional array circuits 200a to 200c shown in FIG. 18. FIG. 19 illustrates device-to-device variations in the resistivity of "1T1R" cells in the layers. The read voltage was set to 0.1V. From the results shown in FIG. 19, in the two-dimensional array circuits 200a to 200c, a range in which the ratio between the resistance in the LRS state and the resistance in the HRS state is larger than 10 shows substantially the same distribution. As a result, it was proven that the degradation of the memory characteristics by the three-dimensional stacking process was not observed.

Figure 20:
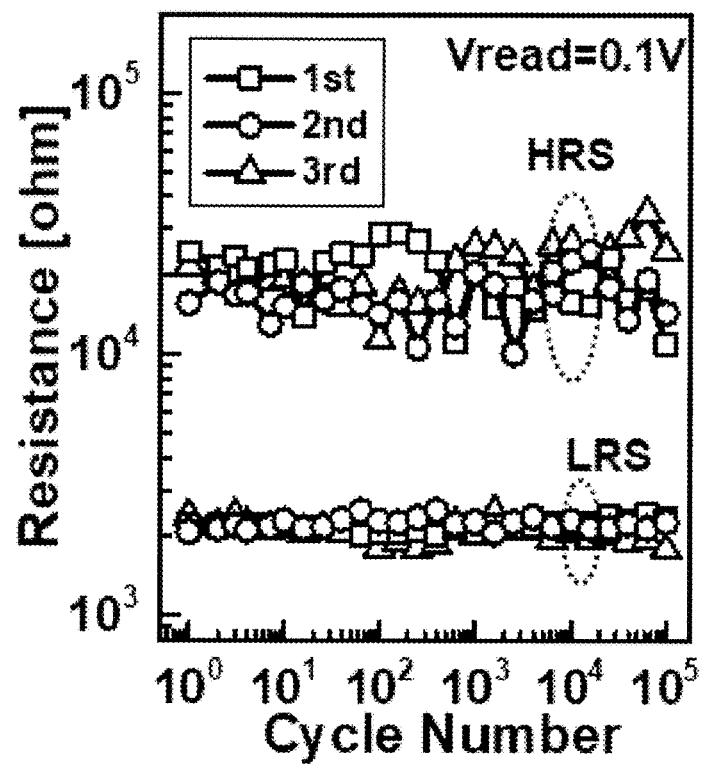
FIG. 20 is a diagram showing rewrite durability properties of respective ReRAM in two-dimensional array circuit at room temperature.
Figure 21:
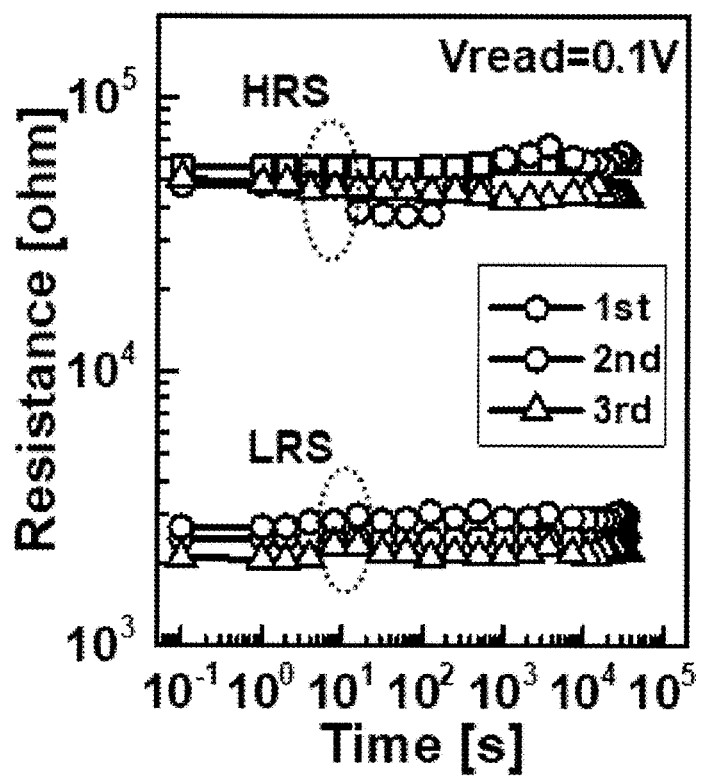
FIG. 21 is a diagram showing retention properties of respective ReRAM in two-dimensional array circuit at room temperature.

FIG. 20 is a diagram showing rewrite durability properties of two-dimensional array circuits 200a to 200c at room temperature in respective ReRAM. The durability property shown in FIG. 20 was measured in a cyclic test in which the pulse duration was 1 μs and Set/Reset potential was 1V/–1.5V. As shown in FIG. 20, in ReRAM of each layer, no degradation was observed after $10^5$ cycles of Set/Reset. In addition, there was no difference in the rewrite durability characteristics between the three layers. FIG. 21 is a diagram showing the retention properties of the two-dimensional arrayed circuits 200a to 200c at room temperature in the respective ReRAM, and no degradation was observed after 12 hours in ReRAM of the respective layers. There was no difference in the retention properties between the three layers. As shown in FIG. 20 and FIG. 21, no significant difference was observed between the two-dimensional array circuits 200a to 200c, and no decrease in reliability was observed due to three-dimensional integration.

The present inventors have actually prototyped an XNOR circuit using the memory cell 230 ("1T1R" cell) having the configuration shown in FIG. 4.

Figure 22:
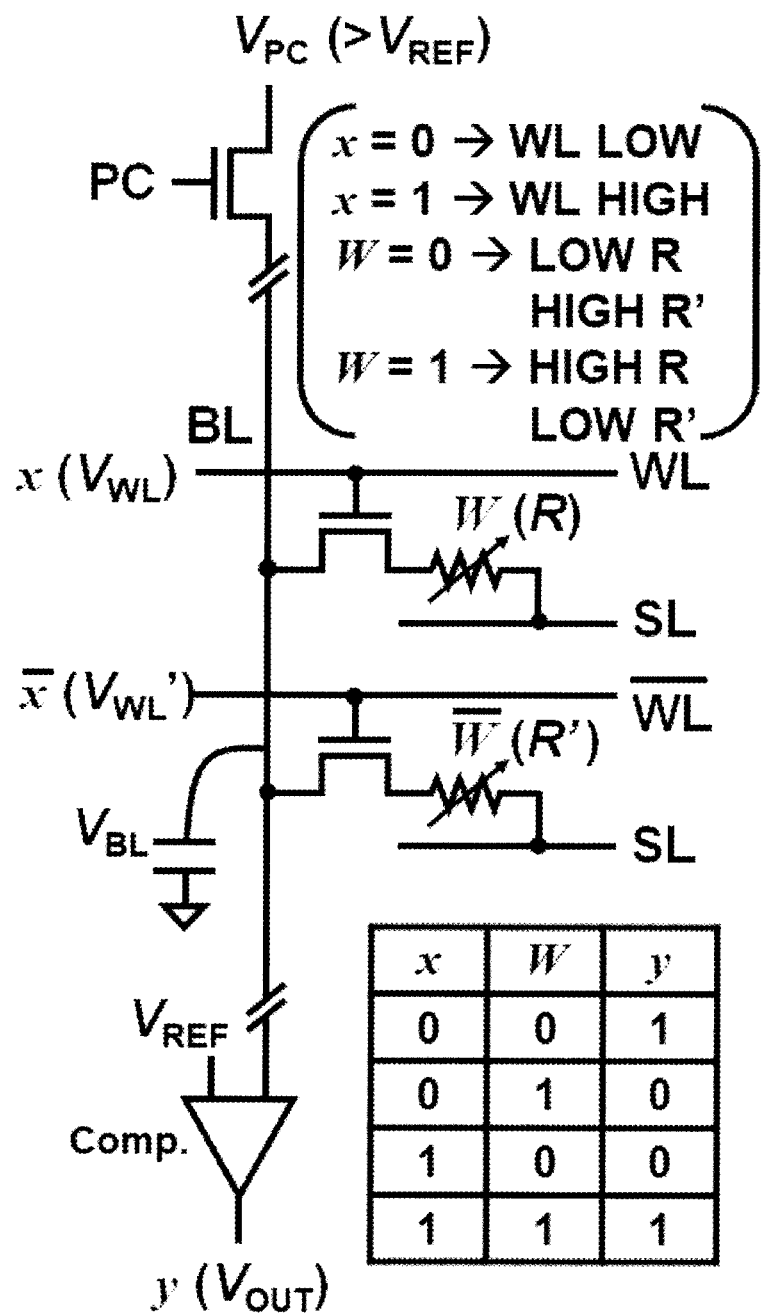
FIG. 22 is a circuit diagram illustrating a configuration of a XNOR circuit using two "1T1R" cells.
Figure 23:
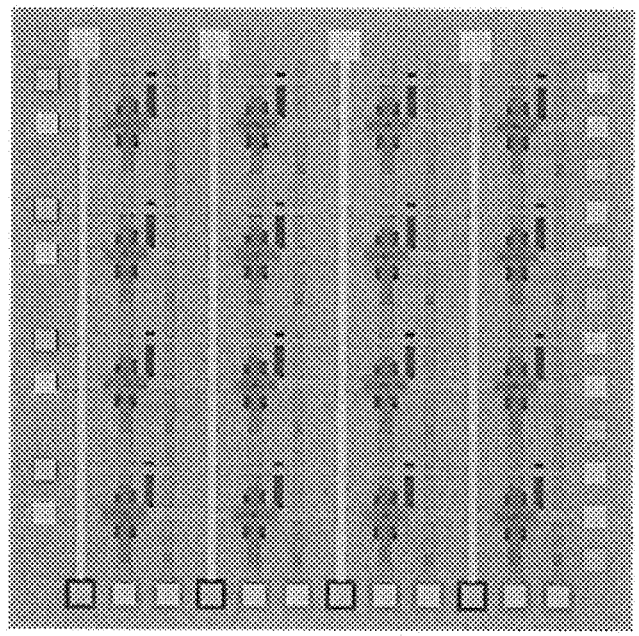
FIG. 23 is a line drawing showing a configuration of a prototype memory cell array of the memory cell of the first embodiment.
Figure 24:
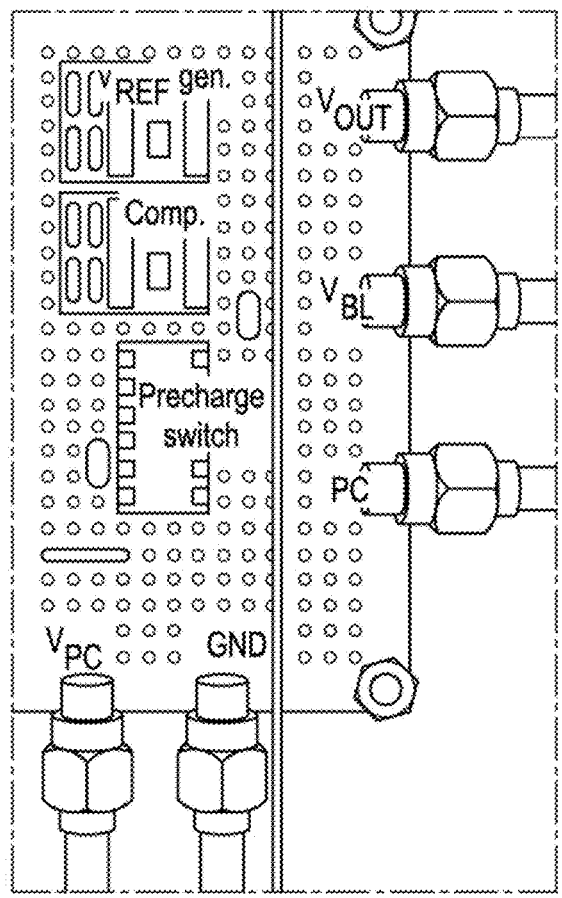
FIG. 24 is a line drawing showing a configuration of an external peripheral circuit used for measuring a prototype XNOR circuit.
Figure 25:
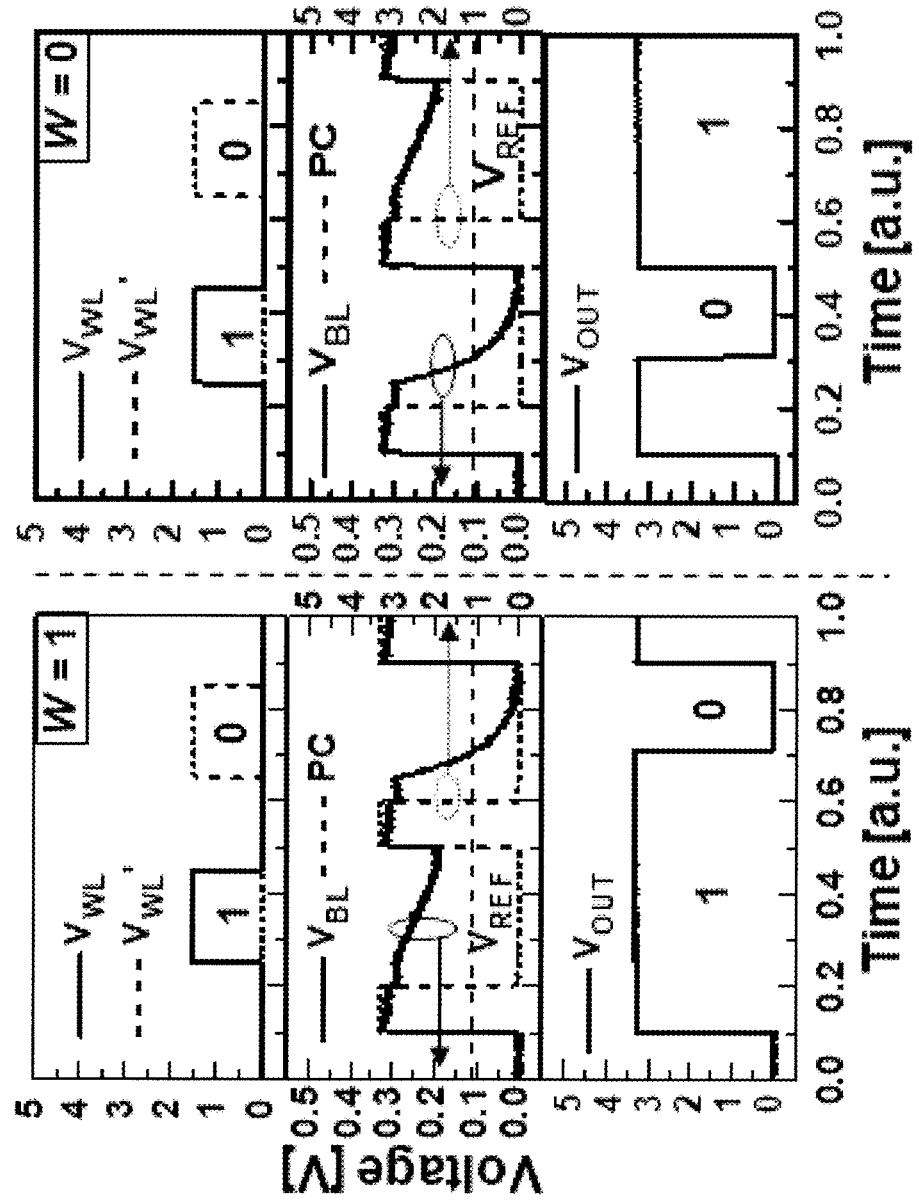
FIG. 25A is a diagram showing a measured result of the prototype XNOR circuit.
FIG. 25B is a diagram showing a measured result of the prototype XNOR circuit.

FIG. 22 is a circuit diagram illustrating a configuration of the XNOR circuit using two "1T1R" cells. FIG. 23 is a drawing substitute photograph showing a configuration of a memory cell array prototyped by the memory cell 230 of the first embodiment. FIG. 24 is a line drawing showing a configuration of an external peripheral circuit used for measuring the prototype XNOR circuit. FIG. 25A and FIG. 25B are diagrams showing the measured data of the prototype XNOR circuit. Specifically, FIG. 25A is a result in the case of (R, R')=(High, Low) in the circuit diagram shown in FIG. 22, and FIG. 25B is a result in the case of (R, R')=(Low, High) in the circuit diagram shown in FIG. 22. When measuring, the precharge voltage ($V_{PC}$)=0.3V, the reference voltage ($V_{REF}$)=0.1V, word line voltage ($V_{WL}$)=1.5V. The power supply voltage of the external peripheral circuit was set to 3.3V.

In the XNOR circuit shown in FIG. 22, weight bits (W) are written to the two ReRAM in a complementary manner. An input bit (x) is applied to two word lines (WL) in a complementary manner. The capacitor ($V_{BL}$) on the bit line (BL) is pre-charged via a precharge switch (PC). The pre-charged capacitor is discharged at a low or high speed depending on the given weight bit (W) and the input bit (x). After a certain period of time, the voltage of the bit line (BL) is compared with the reference voltage ($V_{REF}$) by a comparator (comp.) and binarized to obtain a final output bit (y).

As described above, in the XNOR circuit, the operation of outputting the binary data is performed by using the fact that the discharging rate of the capacitor differs according to the difference between the two resistances (R, R') written complementarily to the two "1T1R" cells and the voltage of the word line. For example, when W=0, R is set to a low resistance state (LRS) and R' is reset to a high resistance state (HRS). At this time, when x=0, ReRAM reset to the high-resistance state is selected, so that the discharging rate of the capacitor becomes slow. On the other hand, when x=1, ReRAM set to the low-resistance state is selected, and thus the discharging rate of the capacitor is increased. Therefore, by appropriately setting the discharge time and the reference voltage, it is possible to detect the voltage of the bit line (BL) and output a comparison result with the reference voltage from the comparator.

As shown in FIG. 25A and FIG. 25B, when the input bit (x) and the weight bit (W) are the same (when x=W=0 or when x=W=1), the discharge rate becomes slow. After a certain period of time has elapsed from the start of discharge, the voltage of the bit line (BL) remains higher than the reference voltage ($V_{REF}$). As a result, "1" is output from the comparator. On the other hand, when the input bit (x) and the weight bit (W) are different from each other (when x=0 and W=1 or when x=1 and W=0), the discharging rate becomes faster. After a certain period of time has elapsed, the voltage of the bit line (BL) becomes lower than the reference voltage ($V_{REF}$). As a result, "0" is output from the comparator. With such an operation, the XNOR operation represented by the truth table shown in FIG. 22 is performed.

As described above, the normal XNOR operation has been confirmed in the XNOR circuit prototyped using the memory cell 230 of the present embodiment.

Modification of the First Embodiment

Although FIG. 4 and FIG. 5 show an example in which a bottom-gate transistor is used as the selection transistor 232, the present invention is not limited to this example, and a top-gate transistor may be used. Further, in FIG. 5, an example is shown in which the top electrode 31 of the resistive random access memory 234 provided in the lower layer is an element of the same layer as the gate electrode 23 of the selection transistor 232 provided in the upper layer adjacent to the lower layer, but these may be an element formed of another layer and separated via the insulating layer.

Figure 26:
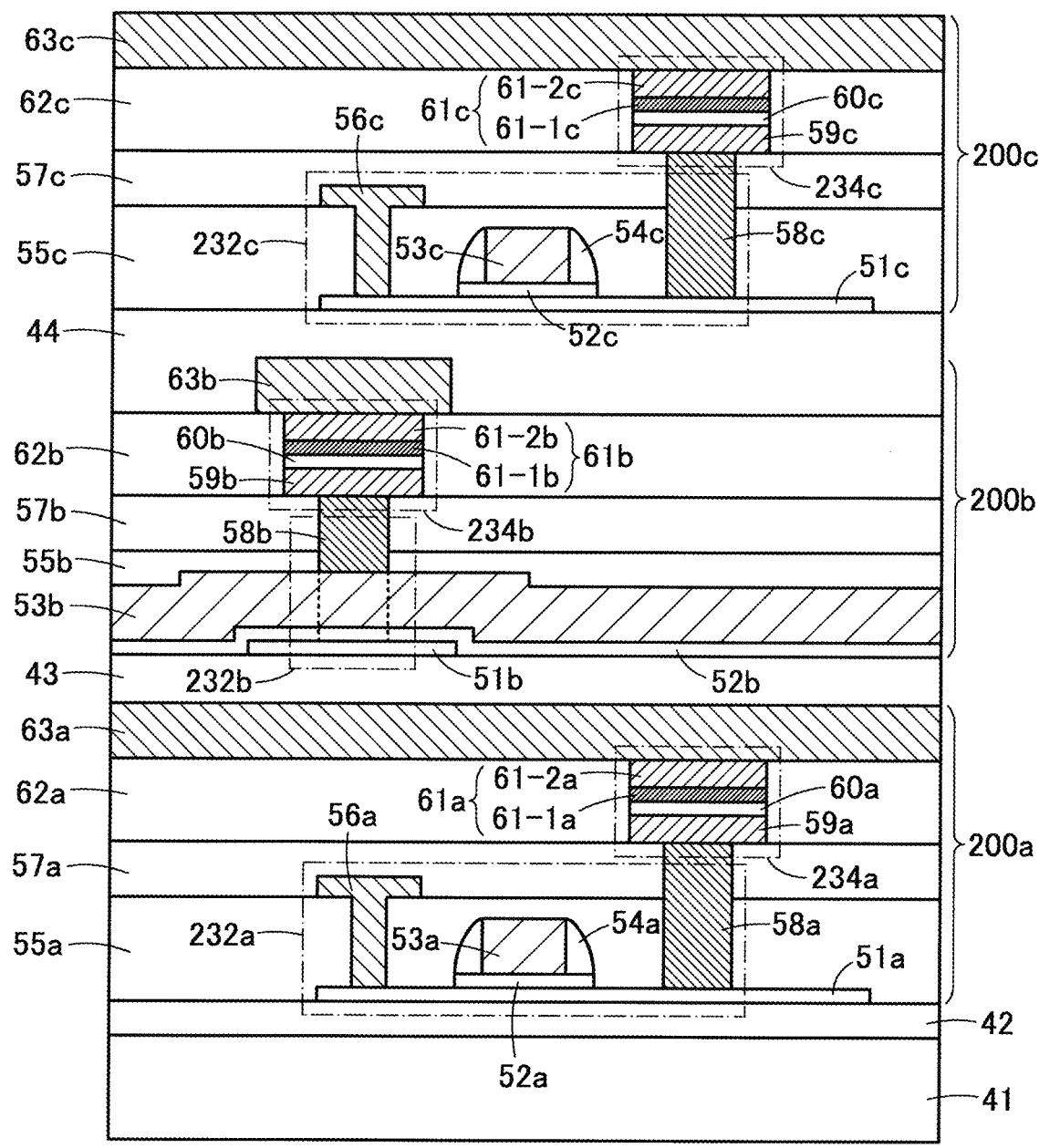
FIG. 26 is an enlarged cross-sectional view illustrating a configuration of a three-dimensional array device according to a modification of the first embodiment.

FIG. 26 is an enlarged cross-sectional view illustrating a configuration of the three-dimensional array device 10 according to a modification of the first embodiment. Specifically, two-dimensional array circuits 200a to 200c each having a top-gate selection transistor 232 are formed on a substrate 41. As shown in FIG. 26, the two-dimensional array circuits 200a to 200c are stacked on the substrate 41 using a thin film forming process. At this time, the two-dimensional array circuits 200a to 200c are isolated by means of insulating layers 43 and 44, respectively. In the present modification, silicon oxide is used as the material constituting the insulating layers 43 and 44, but the present invention is not limited to this example, and other insulating materials (for example, an inorganic material such as silicon nitride or a resin material such as polyimide or acrylic) can be used.

In FIG. 26, the substrate 41 is a silicon substrate, and an insulating layer 42 is a silicon oxide layer. As the substrate 41 and the insulating layer 42, the same materials as those of the substrate 21 and the insulating layer 22 shown in FIG. 4 can be used. When the substrate 41 is a silicon substrate, an integrated circuit made of a silicon CMOS may be formed. FIG. 26 shows an example in which the two-dimensional array circuits 200a to 200c are stacked on the substrate 41 and the insulating layer 42 for simplicity of explanation, but in practice, the two-dimensional array circuits 200d and 200e are further stacked on the two-dimensional array circuit 200c. Since each of the two-dimensional array circuits 200a to 200c has the same structure, a specific structure of the two-dimensional array circuit 200a will be described in the following description.

As shown in FIG. 26, a channel layer 51a, a gate insulating layer 52a, a gate electrode 53a, and a sidewall 54a are provided on the insulating layer 42. In this modification, IGZO, hafnium oxide, tantalum, and silicon oxide are used as the components of the channel layer 51a, the gate insulating layer 52a, the gate electrode 53a, and the sidewall 54a, respectively. However, not limited to this example, as the material constituting the channel layer 51a, the gate insulating layer 52a, and the gate electrode 53a, the same material as the channel layer 25, the gate insulating layer 24, and the gate electrode 23 shown in FIG. 4 can be used. As a material constituting the sidewall 54a, an insulating layer other than silicon oxide may be used. The gate electrode 53a functions as a top gate of the selection transistor 232 and also functions as a word line WL.

A source electrode 56a is provided on the insulating layer 55a covering the channel layer 51a, the gate insulating layer 52a, the gate electrode 53a, and the sidewall 54a. The source electrode 56a is connected to the channel layer 51a via a contact hole formed in the insulating layer 55a. In the present modification example, silicon oxide and tantalum nitride are used as materials constituting the insulating layer 55a and the source electrode 56a, respectively, but the present invention is not limited to this example. Although not shown, the source electrode 56a is connected to the source line SL. It is preferable that the gate electrode and the source/drain electrodes are self-aligned.

An insulating layer 57a is provided on the source electrode 56a. In the insulating layer 55a and the insulating layer 57a, a via hole penetrating therethrough is formed, and an electrode 58a is provided inside the via hole. In the present modification example, tantalum nitride is used as a material constituting the electrode 58a, but the present invention is not limited to this example. The upper surfaces of the insulating layers 57a and the electrodes 58a are planarized using, for example, CMP (Chemical Mechanical Polishing).

A resistive random access memory 234a is provided on the insulating layer 57a. In this modification, the resistive random access memory 234a includes the bottom electrode 59a, the variable resistance layer 60a, the first metal layer 61-1a, and the second metal layer 61-2a. The stacked electrode composed of the first metal layer 61-1a and the second metal layer 61-2a functions as the top electrode 61a of the resistive random access memory 234a. In this modification, the bottom electrode 59a, the variable resistance layer 60a, the first metal layer 61-1a, and the second metal layer 61-2a are made of titanium nitride, hafnium oxide, titanium, and titanium nitride, respectively. The present invention is not limited to this example, and the bottom electrode 59a and the top electrode 61a may be made of another metal material, or the variable resistance layer 60a may be made of another insulating material.

In the present modification, the resistive random access memory 234a has a structure called a pillar type. Such a pillar-type resistive random access memory 234a can be formed, for example, by stacking a titanium nitride layer, a hafnium oxide layer, a titanium layer, and a titanium nitride layer in order from the lower layer, and then performing etching collectively.

In this modification, the side surface of the resistive random access memory 234a is covered with an insulating layer 62a. In such a configuration, after the resistive random access memory 234a formed by the above-described methods is covered with the insulating layer 62a, the thickness of the insulating layer 62a may be reduced by CMP or the like until the upper surface of the second metallic layer 61-2a is exposed. However, the present invention is not limited to this example, and the resistive random access memory 234a may be formed by any method.

A wiring 63a is provided on the insulating layer 62a. The wiring 63a functions as a bit line BL. In the present modification example, tungsten is used as a material constituting the wiring 63a, but the present invention is not limited to this example. The same material as that of the gate electrode 53a can be used as the material constituting the wiring 63a.

On the two-dimensional array circuit 200a having the structure described above, the two-dimensional array circuit 200b is provided via the insulating layer 43. The structure of the two-dimensional array circuit 200b is the same as that of the two-dimensional array circuit 200a, and elements having the same numbers have the same function. As described with reference to FIG. 3, the two-dimensional array circuit 200a and the two-dimensional array circuit 200b have positional relationships rotated by 90 degrees with each other in a plan view. Therefore, as shown in FIG. 26, the word line WL (gate electrode 53a) of the two-dimensional array circuit 200a is substantially orthogonal to the word line WL (gate electrode 53b) of the two-dimensional array circuit 200b. Similarly, the bit line BL (wiring 63a) of the two-dimensional array circuit 200a is substantially orthogonal to the bit line BL (wiring 3b) of the two-dimensional array circuit 200b.

The relationship between the two-dimensional array circuit 200a and the two-dimensional array circuit 200b is the same between the two-dimensional array circuit 200b and the two-dimensional array circuit 200c, and thus a detailed description thereof will be omitted.

As described above, the insulating layers 43 and 44 are interposed between the two-dimensional array circuits 200a to 200c. Therefore, for example, the output part of the two-dimensional array circuit 200a is electrically connected to the input part of the two-dimensional array circuit 200b through vias provided in the insulating layer 43 (not shown). Similarly, the output of the two-dimensional array circuit 200b is electrically connected to the input of the two-dimensional array circuit 200c through vias provided in the insulating layer 44 (not shown). As described above, in the present modification, the output part of the two-dimensional array circuit on the lower layer side and the input part of the two-dimensional array circuit on the upper layer side are electrically connected through vias provided in the insulating layer between the two two-dimensional array circuits. Therefore, the wiring distance between the output part of the two-dimensional array circuit on the lower layer side and the input part of the two-dimensional array circuit on the upper layer side can be shortened, and the influence of the wiring delay and the energy loss can be suppressed.

Second Embodiment

In the first embodiment, it is assumed that a binary neural network is configured by the two-dimensional array circuit 200. Thus, the inputs and outputs of each two-dimensional array circuit 200 are processed in a digital manner using digital signals (binary data).

Figure 27:
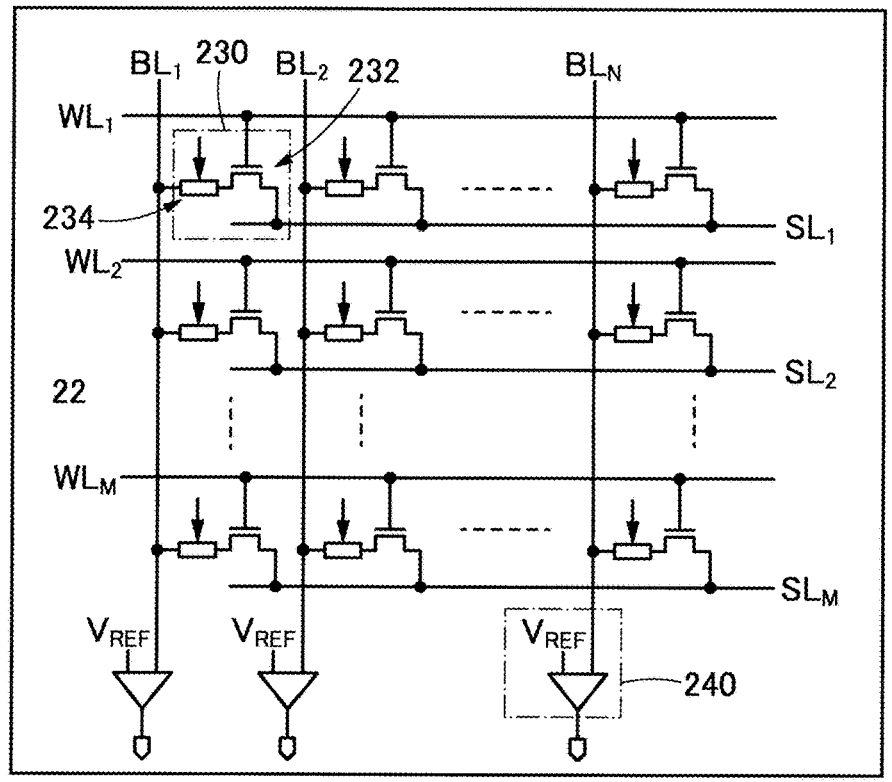
FIG. 27 is a circuit diagram illustrating a configuration of a memory cell array circuit that executes arithmetic processing in a digital manner.

FIG. 27 is a circuit diagram illustrating a configuration of a memory cell array circuit that executes arithmetic processing in a digital manner. In the memory cell array circuit shown in FIG. 27, a comparator 240 is arranged at the output terminal of the bit line BL. The comparator 240 compares the output data of the bit line BL with the reference data ($V_{REF}$). In the example illustrated in FIG. 27, a 1 bit digital signal is output in accordance with the output data of the bit line BL input to the comparator 240.

On the other hand, the two-dimensional array circuit 200 is not limited to the digital system, and it is also possible to perform input and output by an analog signal and perform arithmetic processing by an analog system.

Figure 28:
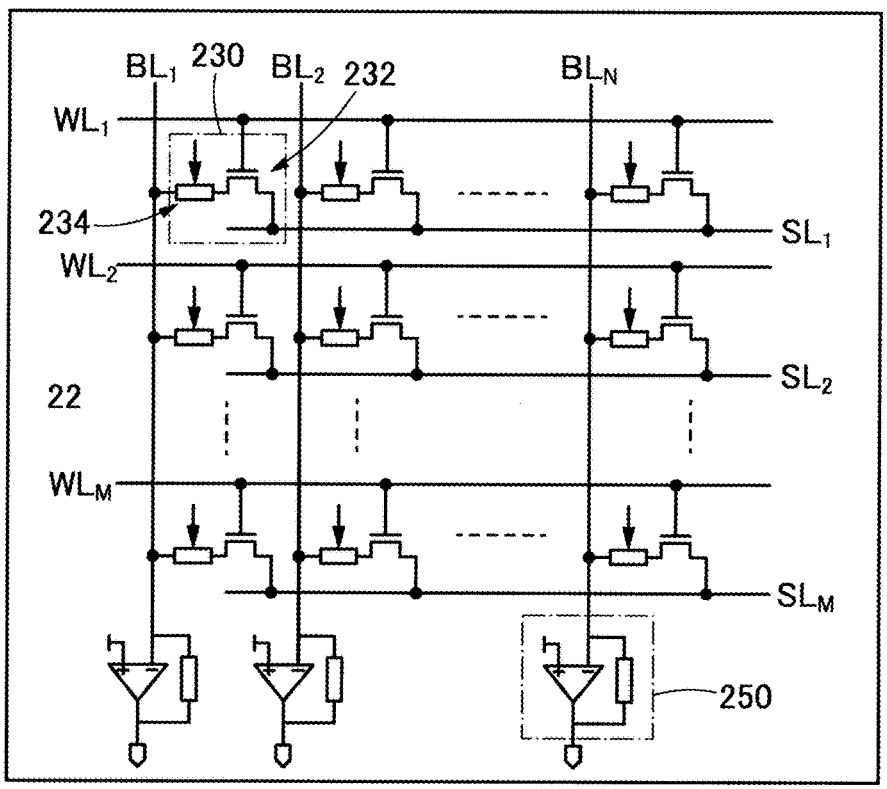
FIG. 28 is a circuit diagram illustrating a configuration of a memory cell array circuit that executes arithmetic processing in an analog manner.

FIG. 28 is a circuit diagram illustrating a configuration of a memory cell array circuit that executes arithmetic processing in an analog manner. Specifically, in the example illustrated in FIG. 28, a configuration in which a multiply-accumulate operation is executed in an analog manner is illustrated. In the memory cell array circuit shown in FIG. 28, the analog amplifier circuit 250 is arranged at the output terminal of the bit line BL. The analog amplifier circuit 250 outputs the output signal of the bit line BL as an analog signal to output the result of the multiply-accumulate operation. In the analog amplifier circuit 250, the impedance connected between the input terminal and the output terminal may be a resistor (R) or a capacitor (C).

In a case where the three-dimensional array device 10 is configured using the two-dimensional array circuit 200 in which the arithmetic circuit of the analog system shown in FIG. 28 is mounted, the analog signal output from the output part 225 of the two-dimensional array circuit 200 of the lower layer is input to the input part 215 of the two-dimensional array circuit 200 of the upper layer. The input part 215 may input the input analog signal directly to the word line WL, or may input the input analog signal to the word line WL after A/D conversion and pulse width modulation. As described above, an analog multiply-accumulate operation is performable by outputting a signal to the bit line in accordance with the resistance value of the memory cell 230 and the input pulse time of the analog input signal or the modulated signal input to the word line WL.

As described above, the three-dimensional array device 10 described in the first embodiment can execute arithmetic processing by any of the digital method and the analog method.

Third Embodiment

In the third embodiment, a three-dimensional array device 10a having a structure different from the three-dimensional array device of the first embodiment will be described. Note that, in the description using the drawings, the same reference numerals as in the first embodiment are given to portions common to the first embodiment, and thus detailed description thereof may be omitted.

Figure 29:
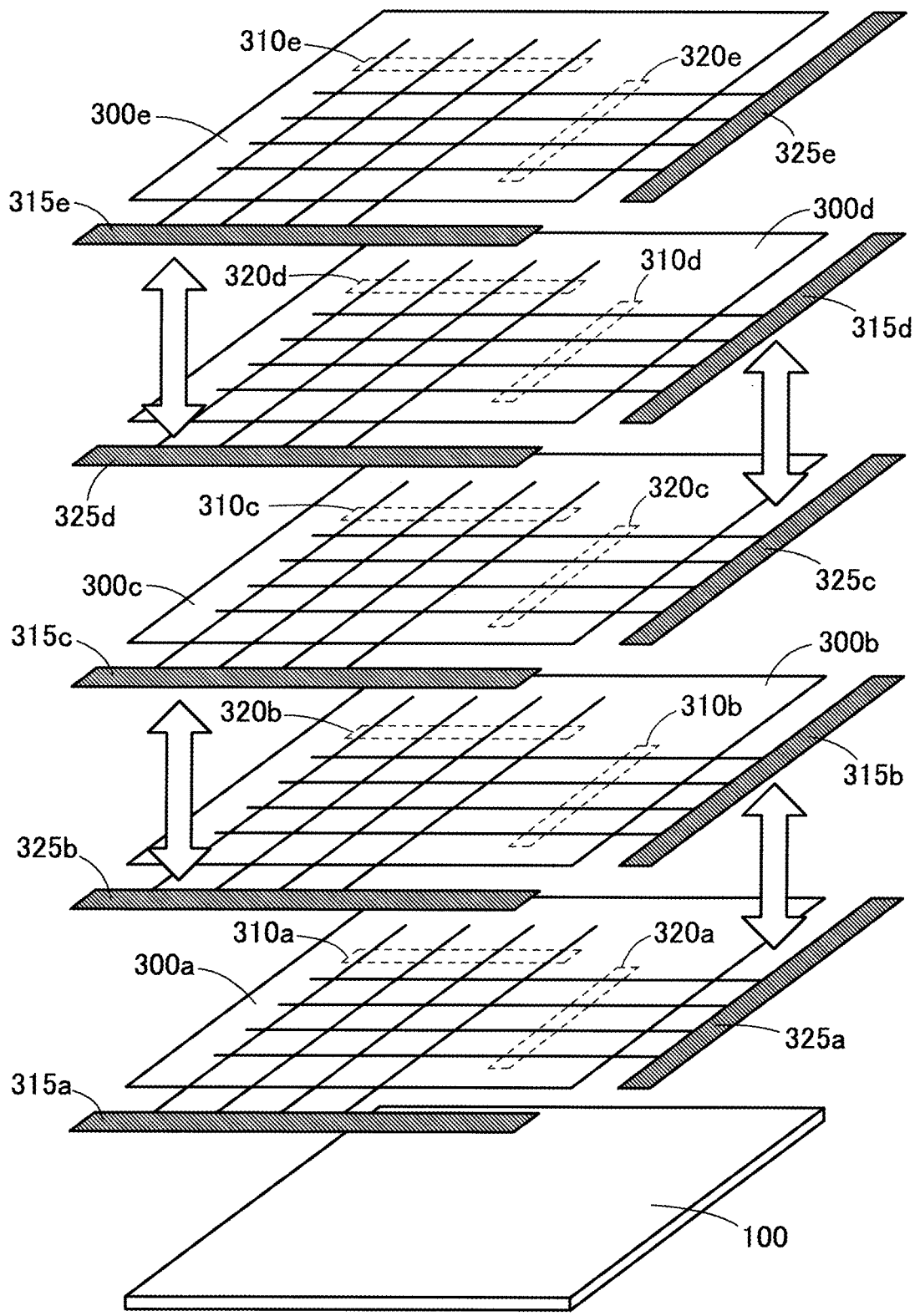
FIG. 29 is a diagram showing a configuration of a three-dimensional array device according to a third embodiment of the present invention.
Figure 30:
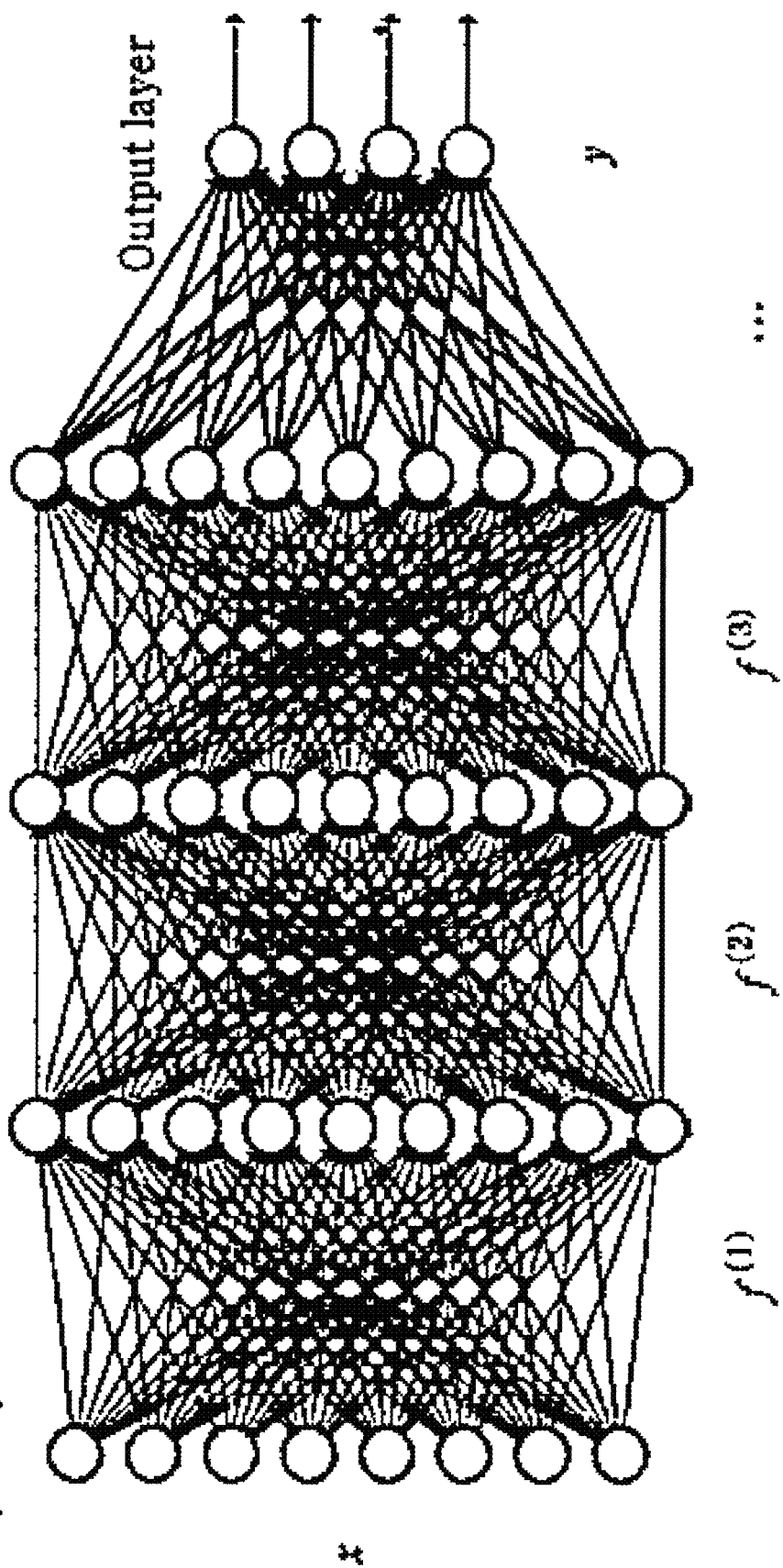
FIG. 30 is a diagram illustrating a configuration of a general neural network.

FIG. 29 is a diagram showing a configuration of the three-dimensional array device 10a according to the third embodiment of the present invention. As illustrated in FIG. 29, the three-dimensional array device 10a includes a control circuit 100 and two-dimensional array circuits 300a to 300e in order from the lower layer. The control circuit 100 controls each operation of the two-dimensional array circuits 300a to 300e. FIG. 29 shows an example in which five-layer two-dimensional array circuits are stacked, but the present invention is not limited to this example, and a two-layer or more layer structure may be employed. In the following description, when it is not necessary to distinguish between the two-dimensional array circuits 300a to 300e, they are collectively referred to as two-dimensional array circuits 300.

As in the first embodiment, the two-dimensional array circuits 300 are memory cell array circuits based on ReRAM. The two-dimensional array circuit 300 includes a first wiring group 310, an input part 315 that inputs a signal to the first wiring group 310, a second wiring group 320 that intersects the first wiring group 310, and an output part 325 that outputs a signal from the second wiring group 320. In the present embodiment, the first wiring group 310 includes a plurality of word lines. The second wiring group 320 includes a plurality of bit lines. The memory cell is provided at an intersection of a word line and a bit line. That is, although not shown, at least one resistive random access memory (ReRAM) and at least one selection transistor are arranged as memory cells at the intersection where the first wiring group 310 and the second wiring group 320 intersect.

The functions of the input part 315 and the output part 325 are the same as those of the input part 215 and the output part 225 of the first embodiment. That is, the input part 315 may include a peripheral circuit for driving the word line WL, and the output part 325 may include a peripheral circuit for driving the bit line BL. Further, electrically connecting the input part 315 and the output part 325 includes electrically connecting a peripheral circuit (a peripheral circuit for driving the word line WL) included in the input part 315 and a peripheral circuit (a peripheral circuit for driving the bit line BL) included in the output part 325.

The three-dimensional array device 10a of the present embodiment has a structure in which the two-dimensional array circuits 300a to 300e are overlapped so that the positions of the input part 315 and the output part 325 are switched from the lower layer to the upper layer. Specifically, in the three-dimensional array device 10a, the input part 315 and the output part 325 are alternately arranged in the vertical direction in a plan view. Therefore, in the three-dimensional array device 10a of the present embodiment, the input part 315 of the two-dimensional array circuit 300 on the upper layer side and the output part 325 of the two-dimensional array circuit 300 on the lower layer side overlap in a plan view.

Further, as indicated by arrows in FIG. 29, the output of the two-dimensional array circuit 300 on the lower layer side is the input of the two-dimensional array circuit 300 on the upper layer side. That is, the output part 325 of the two-dimensional array circuit 300 on the lower layer side is electrically connected to the input part 315 of the two-dimensional array circuit 300 on the upper layer side. However, as in the first embodiment, any method may be used for connection between the input part 315 of the two-dimensional array circuit 300 on the upper layer side and the output part 325 of the two-dimensional array circuit 300 on the lower layer side.

In the present embodiment, since the output part 325 of the two-dimensional array circuit 300 on the lower layer side and the input part 315 of the two-dimensional array circuit 300 on the upper layer side are overlapped in the vertical direction, the wiring length between the output part 325 and the input part 315 can be minimized. That is, with this structure, it is possible to provide the three-dimensional array device 10a that can suppress an increase in signal delay and power consumption caused by the wiring length and realize a neural network with low latency and low energy loss as compared with the prior art.

Fourth Embodiment

In the embodiment described above, an example in which one two-dimensional array circuit is included in each layer constituting the three-dimensional array device has been described, but the present invention is not limited to this example. For example, the three-dimensional array device may have a structure in which m layer (m is a natural number) circuit groups are stacked in the three-dimensional direction, and each layer may have n (n is a natural number) two-dimensional array circuits. That is, the three-dimensional array device of the present embodiment may be configured by electrically connecting m×n two-dimensional array circuits.

In the n two-dimensional array circuits provided in each layer, the output of the two-dimensional array circuit of the previous stage and the input of the two-dimensional array circuit of the subsequent stage are electrically connected. The output of the final stage of two-dimensional array circuits in the lower layer is overlapped and electrically connected to the input of the first two-dimensional array circuit in the adjacent upper layer in a plan view. The values of m and n can be appropriately designed in consideration of an increase in footprint and an increase in cost due to multi-layering.

Each of the embodiments described above can be appropriately combined as the embodiment of the present invention as long as they are not mutually contradictory. Based on each embodiment, appropriately adds, deletes, or changes in design of the constituent elements, or adds, omits, or changes in conditions of the steps by a person skilled in the art are also included in the scope of the present invention as long as the gist of the present invention is provided.

In addition, it is understood that the present invention provides other operational effects that are different from the operational effects provided by the aspects of the above-described embodiments, and those that are obvious from the description of the present specification or those that can be easily predicted by a person skilled in the art.

What is claimed is:

1. A three-dimensional array device with multiple layers in a height direction comprising:
    a first two-dimensional array circuit located in a first layer; and
    a second two-dimensional array circuit located in a second layer adjacent to the first layer and overlapping with the first two-dimensional array circuit in a plan view, wherein
    each of the first two-dimensional array circuit and the second two-dimensional array circuit has a first wiring group, an input part for inputting a signal to the first wiring group, a second wiring group intersecting with the first wiring group in a plan view, and an output part for outputting a signal from the second wiring group, and
    the output part in the first two-dimensional array circuit overlaps with the input part in the second two-dimensional array circuit in a plan view and is connected in a signal transferable manner.

2. The three-dimensional array device according to claim 1, wherein the input part in the first two-dimensional array circuit does not overlap the output part in the second two-dimensional array circuit in a plan view.

3. The three-dimensional array device according to claim 1, wherein the output part in the first two-dimensional array circuit is electrically connected to the input part in the second two-dimensional array circuit through vias.

4. The three-dimensional array device according to claim 1, wherein each of the first two-dimensional array circuit and the second two-dimensional array circuit is a memory cell array circuit.

5. The three-dimensional array device according to claim 4, wherein the first wiring group is a wiring group consisting of word lines, and
    the second wiring group is a wiring group consisting of bit lines.

6. The three-dimensional array device according to claim 4, wherein the memory cell array circuit includes at least one resistive random access memory and at least one selection transistor in each memory cell.

7. The three-dimensional array device according to claim 6, wherein the resistive random access memory has a dielectric layer containing hafnium oxide.

8. The three-dimensional array device according to claim 6, wherein the selection transistor has a channel composed of an oxide semiconductor containing IGZO.

9. A three-dimensional array device with multiple layers in a height direction comprising:
    a first two-dimensional array circuit located in a first layer; and
    a second two-dimensional array circuit located in a second layer adjacent to the first layer and overlapping with the first two-dimensional array circuit in a plan view, wherein
    each of the first two-dimensional array circuit and the second two-dimensional array circuit has a first wiring group, an input part for inputting a signal to the first wiring group, a second wiring group intersecting the first wiring group, and an output part for outputting a signal from the second wiring group,
    the output part in the first two-dimensional array circuit is located closer to the input part in the second two-dimensional array circuit than the output part in the second two-dimensional array circuit, and is connected to the input part in the second two-dimensional array circuit in a signal transferable manner, and a direction in which the second wiring group extends in the first two-dimensional array circuit is approximately parallel to a direction in which the first wiring group extends in the second two-dimensional array circuit.

10. The three-dimensional array device according to claim 9, wherein the input part in the first two-dimensional array circuit does not overlap the output part in the second two-dimensional array circuit in a plan view.

11. The three-dimensional array device according to claim 9, wherein the output part in the first two-dimensional array circuit is electrically connected to the input part in the second two-dimensional array circuit through vias.

12. The three-dimensional array device according to claim 9, wherein each of the first two-dimensional array circuit and the second two-dimensional array circuit is a memory cell array circuit.

13. The three-dimensional array device according to claim 12, wherein the first wiring group is a wiring group consisting of word lines, and
the second wiring group is a wiring group consisting of bit lines.

14. The three-dimensional array device according to claim 12, wherein the memory cell array circuit includes at least one resistive random access memory and at least one selection transistor in each memory cell.

15. The three-dimensional array device according to claim 14, wherein the resistive random access memory has a dielectric layer containing hafnium oxide.

16. The three-dimensional array device according to claim 14, wherein the selection transistor has a channel composed of an oxide semiconductor containing IGZO.

* * * * *